US012722296B2

(12) United States Patent
Murray et al.

(10) Patent No.: US 12,722,296 B2
(45) Date of Patent: Sep. 1, 2026

(54) MOTION PLANNING AND CONTROL FOR ROBOTS IN SHARED WORKSPACE EMPLOYING STAGING POSES

(71) Applicant: REALTIME ROBOTICS, INC., Boston, MA (US)

(72) Inventors: Sean Murray, Victor, MT (US); Peter Englert, Berlin (DE); Xianchao Long, Waltham, MA (US); Arne Sieverling, Berlin (DE); Ty Tremblay, Melrose, MA (US)

(73) Assignee: REALTIME ROBOTICS, INC., Boston, MA (US)

( * ) Notice: Subject to any disclaimer, the term of this patent is extended or adjusted under 35 U.S.C. 154(b) by 524 days.

(21) Appl. No.: 18/119,381

(22) Filed: Mar. 9, 2023

(65) Prior Publication Data

US 2023/0286156 A1 Sep. 14, 2023

Related U.S. Application Data

(60) Provisional application No. 63/318,933, filed on Mar. 11, 2022.

(51) Int. Cl.
*B25J 9/16* (2006.01)
*B25J 19/02* (2006.01)

(52) U.S. Cl.
CPC ........... *B25J 9/1666* (2013.01); *B25J 9/1682* (2013.01); *B25J 9/16* (2013.01); *B25J 19/02* (2013.01)

(58) Field of Classification Search
CPC . B25J 9/1666; B25J 9/1682; B25J 9/16; B25J 19/02; B25J 9/0084; B25J 9/1676; G05B 2219/39135; G05B 2219/40477
See application file for complete search history.

(56) References Cited

U.S. PATENT DOCUMENTS 4,163,183 A 7/1979 Dunne et al.
4,300,198 A 11/1981 Davini
(Continued)

FOREIGN PATENT DOCUMENTS

CA 3071332 A1 1/2019
CN 101837591 A 9/2010
(Continued)

OTHER PUBLICATIONS

Chen, Jingkai, et al. "Cooperative task and motion planning for multi-arm assembly systems." arXiv preprint arXiv:2203.02475 (2022). (Year: 2020).*

(Continued)

*Primary Examiner* — Ramon A. Mercado
*Assistant Examiner* — Tyler Roger Robarge
(74) *Attorney, Agent, or Firm* — Cozen O'Connor

(57) ABSTRACT

The structures and algorithms described herein employ staging poses to facilitate the operation robots operating in a shared workspace or workcell, preventing or at least reducing the risk of collision while efficiently moving robots to one or more goals to perform respective tasks. Motion planning can be performed during runtime, and includes identifying one or more staging poses for a robot to advantageously position or configure a robot whose path is blocked or is expected to be blocked by one or more other robots, monitoring the other robots and moving the robot toward a goal in response to the path becoming unblocked or cleared. The staging pose can be identified using various heuristics to efficiently position or configure the robot to complete its task one its path becomes unblocked or cleared.

23 Claims, 7 Drawing Sheets

(56) References Cited

U.S. PATENT DOCUMENTS 4,763,276 A 8/1988 Perreirra et al.
4,862,373 A 8/1989 Meng
4,890,241 A 12/1989 Hoffman et al.
4,949,277 A 8/1990 Trovato et al.
5,177,563 A 1/1993 Everett et al.
5,297,238 A 3/1994 Wang et al.
5,347,459 A 9/1994 Greenspan et al.
5,544,282 A 8/1996 Chen et al.
5,727,132 A 3/1998 Arimatsu et al.
6,004,016 A 12/1999 Spector
6,049,756 A 4/2000 Libby
6,089,742 A 7/2000 Warmerdam et al.
6,259,988 B1 7/2001 Galkowski et al.
6,345,213 B1 2/2002 Graeser et al.
6,470,301 B1 10/2002 Barral
6,493,607 B1 12/2002 Bourne et al.
6,526,372 B1 2/2003 Orschel et al.
6,526,373 B1 2/2003 Barral
6,529,852 B2 3/2003 Knoll et al.
6,539,294 B1 3/2003 Kageyama
6,629,037 B1 9/2003 Nyland
6,671,582 B1 12/2003 Hanley
6,836,702 B1 12/2004 Brogaardh et al.
6,907,133 B2 6/2005 Gotoh
6,944,584 B1 9/2005 Tenney et al.
7,493,231 B2 2/2009 Graf
7,577,498 B2 8/2009 Jennings et al.
7,609,020 B2 10/2009 Kniss et al.
7,715,946 B2 5/2010 Watanabe et al.
7,865,277 B1 1/2011 Larson et al.
7,904,202 B2 3/2011 Hoppe
7,940,023 B2 5/2011 Kniss et al.
7,983,487 B2 7/2011 Agrawal et al.
7,996,197 B1 8/2011 Xavier
8,082,064 B2 12/2011 Kay
8,103,085 B1 1/2012 Zadeh
8,111,904 B2 2/2012 Wallack et al.
8,162,584 B2 4/2012 Michael et al.
8,315,738 B2 11/2012 Chang et al.
8,571,706 B2 10/2013 Zhang et al.
8,666,548 B2 3/2014 Lim
8,825,207 B2 9/2014 Kim et al.
8,825,208 B1 9/2014 Benson
8,855,812 B2 10/2014 Kapoor
8,880,216 B2 11/2014 Izumi et al.
8,972,057 B1 3/2015 Freeman et al.
8,989,897 B2 3/2015 De Smet
9,061,421 B2 6/2015 Trompeter
9,092,698 B2 7/2015 Buehler et al.
9,102,055 B1 8/2015 Konolige et al.
9,227,322 B2 1/2016 Graca et al.
9,280,899 B2 3/2016 Biess et al.
9,327,397 B1 5/2016 Williams et al.
9,333,044 B2 5/2016 Olson
9,434,072 B2 9/2016 Buehler et al.
9,539,058 B2 1/2017 Tsekos et al.
9,632,502 B1 4/2017 Levinson et al.
9,645,577 B1 5/2017 Frazzoli et al.
9,659,236 B2 5/2017 Barker et al.
9,687,982 B1 6/2017 Jules et al.
9,687,983 B1 6/2017 Prats
9,701,015 B2 7/2017 Buehler et al.
9,707,682 B1 7/2017 Konolige et al.
9,731,724 B2 8/2017 Yoon
9,981,382 B1 5/2018 Strauss et al.
9,981,383 B1 5/2018 Nagarajan
10,035,266 B1 7/2018 Kroeger
10,099,372 B2 10/2018 Vu et al.
10,124,488 B2 11/2018 Lee et al.
10,131,053 B1 11/2018 Sampedro et al.
10,296,012 B2 5/2019 Lalonde et al.
10,300,605 B2 5/2019 Sato
10,303,180 B1 5/2019 Prats
10,430,641 B2 10/2019 Gao
10,671,081 B1 6/2020 Prats
10,688,664 B2 6/2020 Kovacs
10,705,528 B2 7/2020 Wierzynski et al.
10,723,024 B2 7/2020 Konidaris et al.
10,782,694 B2 9/2020 Zhang et al.
10,792,114 B2 10/2020 Hashimoto et al.
10,824,862 B2 11/2020 Qi et al.
10,959,795 B2 3/2021 Hashimoto et al.
11,314,254 B2 4/2022 Macias et al.
11,358,337 B2 6/2022 Czinger et al.
11,407,117 B1 8/2022 Hickman
11,623,494 B1 4/2023 Arnicar et al.
11,751,948 B2 9/2023 Gregerson et al.
11,986,955 B2 5/2024 Agarwal et al.
2002/0013675 A1 1/2002 Knoll et al.
2002/0074964 A1 6/2002 Quaschner et al.
2003/0155881 A1 8/2003 Hamann et al.
2004/0249509 A1 12/2004 Rogers et al.
2005/0071048 A1 3/2005 Watanabe et al.
2005/0216181 A1 9/2005 Estkowski et al.
2006/0235610 A1 10/2006 Ariyur et al.
2006/0241813 A1 10/2006 Babu et al.
2006/0247852 A1 11/2006 Kortge et al.
2007/0106422 A1 5/2007 Jennings et al.
2007/0112700 A1 5/2007 Den et al.
2007/0239315 A1 10/2007 Sato et al.
2008/0002893 A1 1/2008 Vincent et al.
2008/0009969 A1 1/2008 Bruemmer et al.
2008/0012517 A1 1/2008 Kniss et al.
2008/0125893 A1 5/2008 Tilove et al.
2008/0186312 A1 8/2008 Ahn et al.
2008/0234864 A1 9/2008 Sugiura et al.
2009/0055024 A1 2/2009 Kay
2009/0192710 A1 7/2009 Eidehall et al.
2009/0234499 A1 9/2009 Nielsen et al.
2009/0295323 A1 12/2009 Papiernik et al.
2009/0326711 A1 12/2009 Chang et al.
2009/0326876 A1 12/2009 Miller
2010/0145516 A1 6/2010 Cedoz et al.
2010/0152899 A1 6/2010 Chang et al.
2010/0235033 A1 9/2010 Yamamoto et al.
2011/0036188 A1 2/2011 Fujioka et al.
2011/0066282 A1 3/2011 Bosscher et al.
2011/0153080 A1 6/2011 Shapiro et al.
2011/0213497 A1* 9/2011 Nair ...................... B25J 9/1666
700/255
2011/0222995 A1 9/2011 Irie et al.
2011/0264111 A1 10/2011 Nowlin et al.
2012/0010772 A1 1/2012 Pack et al.
2012/0053728 A1 3/2012 Theodorus et al.
2012/0083964 A1 4/2012 Montemerlo et al.
2012/0209428 A1 8/2012 Mizutani
2012/0215351 A1 8/2012 Mcgee et al.
2012/0297733 A1 11/2012 Pierson et al.
2012/0323357 A1 12/2012 Izumi et al.
2013/0076866 A1 3/2013 Drinkard et al.
2013/0135315 A1 5/2013 Bares et al.
2013/0325244 A1 12/2013 Wang et al.
2013/0346348 A1 12/2013 Buehler et al.
2014/0012419 A1 1/2014 Nakajima
2014/0025201 A1 1/2014 Ryu et al.
2014/0025203 A1 1/2014 Inazumi
2014/0039825 A1 2/2014 Antonini et al.
2014/0058406 A1 2/2014 Tsekos
2014/0067121 A1 3/2014 Brooks et al.
2014/0079524 A1 3/2014 Shimono et al.
2014/0121833 A1 5/2014 Lee et al.
2014/0121837 A1 5/2014 Hashiguchi et al.
2014/0147240 A1 5/2014 Noda et al.
2014/0156068 A1 6/2014 Graca et al.
2014/0249741 A1 9/2014 Levien et al.
2014/0251702 A1 9/2014 Berger et al.
2014/0277718 A1 9/2014 Izhikevich et al.
2014/0305227 A1 10/2014 Johns
2014/0309916 A1 10/2014 Bushnell
2014/0368504 A1 12/2014 Chen et al.
2015/0005785 A1 1/2015 Olson
2015/0037131 A1 2/2015 Girtman et al.
2015/0051783 A1 2/2015 Tamir et al.
2015/0134111 A1 5/2015 Nakajima

(56) References Cited

U.S. PATENT DOCUMENTS

2015/0217455 A1 8/2015 Kikkeri et al.
2015/0261899 A1 9/2015 Atohira et al.
2015/0266182 A1 9/2015 Strandberg
2016/0001775 A1 1/2016 Wilhelm et al.
2016/0008078 A1* 1/2016 Azizian .................. A61B 34/20 700/255
2016/0016312 A1 1/2016 Lawrence et al.
2016/0046022 A1 2/2016 Hazan et al.
2016/0059412 A1 3/2016 Oleynik
2016/0107313 A1 4/2016 Hoffmann et al.
2016/0112694 A1 4/2016 Nishi et al.
2016/0121486 A1 5/2016 Lipinski et al.
2016/0121487 A1 5/2016 Mohan et al.
2016/0154408 A1 6/2016 Eade et al.
2016/0161257 A1 6/2016 Edward et al.
2016/0299507 A1 10/2016 Shah et al.
2016/0324587 A1 11/2016 Olson
2016/0357187 A1 12/2016 Ansari
2017/0001775 A1 1/2017 Cimmerer et al.
2017/0004406 A1 1/2017 Aghamohammadi
2017/0028559 A1 2/2017 Davidi et al.
2017/0097631 A1 4/2017 Linnell et al.
2017/0120448 A1 5/2017 Lee et al.
2017/0123419 A1 5/2017 Levinson et al.
2017/0132334 A1 5/2017 Levinson et al.
2017/0146999 A1 5/2017 Cherepinsky et al.
2017/0157769 A1 6/2017 Aghamohammadi et al.
2017/0168485 A1 6/2017 Berntorp et al.
2017/0168488 A1 6/2017 Wierzynski et al.
2017/0193830 A1 7/2017 Fragoso et al.
2017/0210008 A1 7/2017 Maeda
2017/0219353 A1 8/2017 Alesiani
2017/0252922 A1 9/2017 Levine et al.
2017/0252924 A1 9/2017 Vijayanarasimhan et al.
2017/0305015 A1 10/2017 Krasny et al.
2017/0315530 A1 11/2017 Godau et al.
2018/0001472 A1 1/2018 Konidaris et al.
2018/0001476 A1 1/2018 Tan et al.
2018/0029231 A1 2/2018 Davis
2018/0029233 A1* 2/2018 Lager ..................... B25J 9/1676
2018/0032039 A1 2/2018 Huynh et al.
2018/0074505 A1 3/2018 Lv et al.
2018/0113468 A1 4/2018 Russell
2018/0129882 A1 5/2018 Seeber et al.
2018/0136662 A1 5/2018 Kim
2018/0150077 A1 5/2018 Danielson et al.
2018/0172450 A1 6/2018 Lalonde et al.
2018/0173242 A1 6/2018 Lalonde et al.
2018/0189683 A1 7/2018 Newman
2018/0222050 A1 8/2018 Vu et al.
2018/0222051 A1 8/2018 Vu et al.
2018/0229368 A1 8/2018 Leitner et al.
2018/0250818 A1 9/2018 Maeda
2018/0281786 A1 10/2018 Oyaizu et al.
2018/0333850 A1 11/2018 Komlsi
2018/0338804 A1* 11/2018 Azizian .................. A61B 6/102
2018/0339456 A1 11/2018 Czinger et al.
2018/0342088 A1 11/2018 Richter et al.
2018/0349702 A1 12/2018 Gildert et al.
2019/0015981 A1 1/2019 Yabushita et al.
2019/0039242 A1 2/2019 Fujii et al.
2019/0049566 A1 2/2019 Adams et al.
2019/0079530 A1 3/2019 Steder et al.
2019/0087976 A1 3/2019 Sugahara et al.
2019/0101930 A1 4/2019 Yadmellat
2019/0105779 A1 4/2019 Einav
2019/0143518 A1* 5/2019 Maeda .................. B25J 9/0087 700/248
2019/0163191 A1 5/2019 Sorin et al.
2019/0164430 A1 5/2019 Nix
2019/0196480 A1 6/2019 Taylor
2019/0216555 A1 7/2019 Dimaio et al.
2019/0232496 A1 8/2019 Graichen et al.
2019/0234751 A1 8/2019 Takhirov
2019/0240835 A1 8/2019 Sorin et al.
2019/0262993 A1 8/2019 Cole et al.
2019/0291277 A1 9/2019 Oleynik
2019/0293443 A1 9/2019 Kelly et al.
2019/0380794 A1 12/2019 Al Jewad et al.
2019/0391597 A1 12/2019 Dupuis
2020/0030971 A1 1/2020 Oleynik
2020/0069134 A1 3/2020 Ebrahimi Afrouzi et al.
2020/0078097 A1 3/2020 Gregerson et al.
2020/0097014 A1 3/2020 Wang
2020/0198140 A1* 6/2020 Dupuis .................. G01C 21/20
2020/0215686 A1 7/2020 Vijayanarasimhan et al.
2020/0233436 A1 7/2020 Fox et al.
2020/0331146 A1 10/2020 Vu et al.
2020/0331155 A1 10/2020 Vu et al.
2020/0338730 A1 10/2020 Yamauchi et al.
2020/0338733 A1 10/2020 Dupuis et al.
2020/0353917 A1 11/2020 Leitermann et al.
2020/0368910 A1 11/2020 Chu et al.
2020/0398428 A1 12/2020 Murray et al.
2021/0009351 A1 1/2021 Beinhofer et al.
2021/0060779 A1* 3/2021 Dupuis .................. B25J 9/0084
2021/0178591 A1 6/2021 Floyd-Jones et al.
2021/0197377 A1 7/2021 Gaschler
2021/0205992 A1* 7/2021 Pandya .................. B25J 9/1664
2021/0220994 A1 7/2021 Colasanto et al.
2022/0080582 A1* 3/2022 Sekimoto .................. B25J 9/10
2022/0088780 A1* 3/2022 Abdul-hadi ............ B25J 9/1664
2022/0187847 A1 6/2022 Cella et al.
2022/0305648 A1 9/2022 Oleynik
2022/0339875 A1 10/2022 Czinger et al.
2022/0355483 A1 11/2022 Lee et al.
2022/0395979 A1 12/2022 Beardsworth
2023/0031545 A1 2/2023 Oleynik
2023/0061855 A1* 3/2023 Lin ........................ B25J 9/1666
2023/0063205 A1 3/2023 Nerkar
2023/0190396 A1* 6/2023 Taheri .................... A61B 34/30 700/245
2023/0363833 A1 11/2023 Gregerson et al.
2025/0073902 A1* 3/2025 Wong ....................... B25J 9/163

FOREIGN PATENT DOCUMENTS

CN 101947788 A 1/2011
CN 102814813 A 12/2012
CN 103722565 A 4/2014
CN 103955221 A 7/2014
CN 104407616 A 3/2015
CN 104858876 A 8/2015
CN 104985598 A 10/2015
CN 105069530 A 11/2015
CN 102186638 B 3/2016
CN 106660208 A 5/2017
CN 107073710 A 8/2017
CN 107206592 A 9/2017
CN 107234634 A 10/2017
CN 107486858 A 12/2017
CN 107617877 A 1/2018
CN 108297059 A 7/2018
CN 108453702 A 8/2018
CN 108789416 A 11/2018
CN 108789500 A 11/2018
CN 108858183 A 11/2018
CN 108942920 A 12/2018
CN 109521763 A 3/2019
CN 112549024 A 3/2021
CN 109782763 B 11/2021
CN 114073585 A * 2/2022
CN 114269525 A 4/2022
DE 102012103830 A1 * 11/2012 ............ B25J 9/1666
EP 1241628 A2 9/2002
EP 1901150 A1 3/2008
EP 2306153 A2 4/2011
EP 3250347 A1 12/2017
EP 3266570 A1 1/2018
EP 3486612 A1 5/2019
EP 3725472 A1 10/2020
JP S6330908 A 2/1988
JP 07100755 4/1995
JP 1997212229 8/1997

(56) References Cited

FOREIGN PATENT DOCUMENTS

| | | | | |
|---|---|---|---|---|
| JP | 10512413 | A | | 11/1998 |
| JP | H10512413 | A | | 11/1998 |
| JP | 1148177 | | | 2/1999 |
| JP | 11296229 | A | | 10/1999 |
| JP | 2001166806 | A | | 6/2001 |
| JP | 2002073130 | A | | 3/2002 |
| JP | 2002116817 | A | | 4/2002 |
| JP | 2003127077 | A | | 5/2003 |
| JP | 2004358630 | A | | 12/2004 |
| JP | 2005022062 | A | | 1/2005 |
| JP | 2005032196 | A | | 2/2005 |
| JP | 2005321196 | A | | 11/2005 |
| JP | 2006224740 | A | | 8/2006 |
| JP | 2007257274 | A | | 10/2007 |
| JP | 2007283450 | A | | 11/2007 |
| JP | 2007531110 | A | | 11/2007 |
| JP | 2008502488 | A | | 1/2008 |
| JP | 2008065755 | A | | 3/2008 |
| JP | 2008134165 | A | | 6/2008 |
| JP | 2010061293 | A | | 3/2010 |
| JP | 2010201592 | A | | 9/2010 |
| JP | 2010210592 | A | | 9/2010 |
| JP | 2011075382 | A | | 4/2011 |
| JP | 2011249711 | A | | 12/2011 |
| JP | 2012056023 | A | | 3/2012 |
| JP | 2012190405 | A | | 10/2012 |
| JP | 2012243029 | A | | 12/2012 |
| JP | 2013193194 | A | | 9/2013 |
| JP | 2014184498 | A | | 10/2014 |
| JP | 2015044274 | A | | 3/2015 |
| JP | 2015517142 | A | | 6/2015 |
| JP | 2015208811 | A | | 11/2015 |
| JP | 2016099257 | A | | 5/2016 |
| JP | 2016190315 | A | | 11/2016 |
| JP | 2016209969 | A | | 12/2016 |
| JP | 2017080845 | A | | 5/2017 |
| JP | 2017131973 | A | | 8/2017 |
| JP | 2017136677 | A | | 8/2017 |
| JP | 2017148908 | A | | 8/2017 |
| JP | 2018505788 | A | | 3/2018 |
| JP | 2018130793 | A | | 8/2018 |
| JP | 2018134703 | A | | 8/2018 |
| JP | 2018144158 | A | | 9/2018 |
| JP | 2018144166 | A | | 9/2018 |
| JP | 2019136848 | A | | 8/2019 |
| JP | 2019188530 | A | | 10/2019 |
| JP | 2019219734 | A | | 12/2019 |
| JP | 2020049554 | A | * | 4/2020 |
| JP | 2020049623 | A | | 4/2020 |
| JP | 2020082332 | A | | 6/2020 |
| JP | 2020110885 | A | | 7/2020 |
| JP | 2022539324 | A | | 9/2022 |
| KR | 19980024584 | A | | 7/1998 |
| KR | 20110026776 | A | | 3/2011 |
| KR | 20120053096 | A | | 5/2012 |
| KR | 20130047544 | A | | 5/2013 |
| KR | 20130112507 | A | | 10/2013 |
| KR | 20150126482 | A | | 11/2015 |
| KR | 20170018564 | A | | 2/2017 |
| KR | 20170044987 | A | | 4/2017 |
| KR | 20170050166 | A | | 5/2017 |
| KR | 20180125646 | A | | 11/2018 |
| TW | 201318793 | A | | 5/2013 |
| TW | 615691 | | | 2/2018 |
| TW | 653130 | | | 3/2019 |
| WO | 9924914 | A1 | | 5/1999 |
| WO | 2011096327 | A1 | | 8/2011 |
| WO | 2015113203 | A1 | | 8/2015 |
| WO | 2016122840 | A1 | | 8/2016 |
| WO | 2017168187 | A1 | | 10/2017 |
| WO | 2017214581 | A1 | | 12/2017 |
| WO | 2018043525 | A1 | | 3/2018 |
| WO | 2018148181 | A1 | | 8/2018 |
| WO | 2019138111 | A1 | | 7/2019 |
| WO | 2019139815 | A1 | | 7/2019 |
| WO | 2019183141 | A1 | | 9/2019 |
| WO | 2020040979 | A1 | | 2/2020 |
| WO | 2020117958 | A1 | | 6/2020 |
| WO | 2020176473 | A1 | | 9/2020 |
| WO | 2020200387 | A1 | | 10/2020 |
| WO | 2021041419 | A1 | | 3/2021 |
| WO | 2021150439 | A1 | | 7/2021 |

OTHER PUBLICATIONS

Christian Frese et al : “Workspace monitoring and planning for safe mobile manipulaiton”, arxiv. org, Cornell University Library, 201 Olin Library Cornell University Ithaca, NY 14853, Jun. 2, 2020 (Jun. 2, 2020), XP081690333. arXiv.2006.01546v1.

EP Search Report mailed Aug. 22, 2024, in EP App. No. 21887233. 1-1201/ 4196323 PCT/US2021056317 , 14 pages.

Magrini Emanuele et al.: “Human-robot coexistence and interaction in open industrial cells”, Robotics and Computer Integrated Manufacturing, Elsevier Science Publishers BV. Barking, GB, vol. 61, Aug. 5, 2019 (Aug. 5, 2019), xp08588002, ISSN: 0736-5845.

Non Final Office Action for U.S. Appl. No. 17/909,801, mailed Jul. 30, 2024, 18 pages.

Notice of Allowance for U.S. Appl. No. 18/221,027, mailed Jul. 1, 2024, 10 pages.

Notice of Allowance for U.S. Appl. No. 18/222,801, mailed Jul. 3, 2024, 9 pages.

Notice of Reasons for Refusal. Japanese Application No. 2023-532462, dated Jun. 21, 2024, 25 pages.

Extended EP Search Report mailed Jan. 29, 2024, EP App No. 21772200.8-1205, 9 pages.

Japanese Decision of Registration for JP 2022-054900, mailed Jan. 9, 2024, 3 pages.

Office Action issued in Taiwan Application No. 109113033, mailed Jan. 19, 2024, 10 pages.

Office Action issued in Taiwan Application No. 109118558, mailed Jan. 4, 2024, 8 pages.

Christian Potthast et al: “Seeing with your hands: A Better way to obtain perception capablities with a personal robot”, Advance Robotics and Its Social Impacts, Oct. 2, 2011, pp. 50-53. xp032235164.

Efrain Lopez-Damian et al: “Probabilistic view planner for 3D modelling indoor environments”, Intelligent Robots and Systems, 2009. Oct. 10, 2009, pp. 4021-4026, xp031580735.

EP Search Report mailed Sep. 1, 2023, EP App No. 21789270.2-1205 /4135940 PCT/US2021026818—23 pages.

Kececi F et al:“Improving Visually Servoed Disassembly Operations by Automatic Camera Placement”, Proceedings of The 1998 IEEE International Conference on Robotics and Automation. ICRA ’98. May 16-20, 1998; New York, NY : IEEE, US ,XP000784527.

Notice of Reasons for Refusal for Japanese Patent Application No. 2021-571340, mailed Aug. 8, 2023, 8 pages.

Communication Pursuant to Article 94(3) EPC, dated Apr. 30, 2024, for European Application No. 19851097.6-1201, 9 pages.

Hassan, Mahdi et al., “An Approach to Base Placement for Effective Collaboration of Multiple Autonomous Industrial Robots”, 2015 IEEE International Conference on Robotics and Automation (ICRA), pp. 3286-3291.

Japanese Notice of Allowance for Application No. 2022-544106, mailed Apr. 30, 2024, 3 pages.

Lim, Zhen Yang et al., “Multi-objective hybrid algorithms for layout optimization in multi-robot cellular manufacturing systems”, Knowledge-Based Systems, vol. 120, pp. 87-98.

Non-Final Office Action Issued in U.S. Appl. No. 15/546,441, Mailed Sep. 17, 2019, 58 Pages.

Non-Final Office Action Issued in U.S. Appl. No. 16/308,693, Mailed May 14, 2021, 16 pages.

Non-Final Office Action Issued in U.S. Appl. No. 16/909,096 Mailed May 6, 2022, 49 pages.

Non-Final Office Action Issued in U.S. Appl. No. 17/506,364, Mailed Apr. 28, 2023, 50 pages.

Non-Final Office Action Issued in U.S. Appl. No. 16/981,467, Mailed Mar. 16, 2023, 19 Pages.

(56) References Cited

OTHER PUBLICATIONS

Non-Final Office Action mailed Sep. 14, 2022, for U.S. Appl. No. 16/999,339, 18 pages.
Notice of Allowance for U.S. Appl. No. 17/153,662, mailed Dec. 6, 2022, 15 pages.
Notice of Allowance mailed Sep. 23, 2021, for Ritchey, "Motion Planning for Autonomous Vehicles and Reconfigurable Motion Planning Processors," U.S. Appl. No. 16/615,493, 11 pages.
Notice of Allowance mailed Dec. 24, 2021, for Sorin, "Apparatus, Method and Article to Facilitate Motion Planning of an Autonomous Vehicle in an Environment Having Dynamic Objects," U.S. Appl. No. 16/240,086, 28 pages.
Notice of Allowance mailed Jan. 25, 2022, for Sorin, "Motion Planning for Autonomous Vehicles and Reconfigurable Motion Planning Processors ," U.S. Appl. No. 16/308,693, 18 pages.
Notice of Allowance mailed Sep. 24, 2021, for Ritchey, "Motion Planning of a Robot Storing a Discretized Environment on one or More Processors and Improved Operation of Same," U.S. Appl. No. 16/268,290, 8 pages.
Notice of Reasons for Rejection dated Feb. 16, 2023, for Japanese Application No. 2021-571340, 10 pages.
Notice of Reasons for Rejection dated Feb. 7, 2023, for Japanese Application No. 2022-054900, 7 pages.
Notice of Reasons for Rejection, issued in corresponding Japanese Application No. 2021-509212, dated Apr. 7, 2022, 6 pages (English Translation).
Notification of Transmittal of International Search Report and Written Opinion for International Application No. PCT/US2021/056317, mailed Feb. 11, 2022, 13 pages.
Office Action Issued in Japanese Application No. 2018-564836, Mailed Date: Dec. 3, 2019, 3 Pages.
Office Action Issued in Japanese Application No. 2018-564836, Mailed Date: May 19, 2020, 5 Pages.
Office Action Issued in Japanese Application No. 2021-171704, Mailed Date: Jan. 28, 2022, 3 Pages.
Office Action Issued in Japanese Application No. 2021-171726, Mailed Date: Jan. 26, 2022, 4 Pages.
Office Action issued in Taiwan Application No. 108104094, mailed Feb. 6, 2023, 24 pages.
or.pdf (Or | Definition of Or by Merriam-Webster, Sep. 9, 2019, https://www.merriam-webster.com/dictionary/or, pp. 1-12; Year: 2019.
Pashkevich AP et al: "Multiobjective optimisation of robot location in a workcell using genetic algorithms", Control '98. UKACC International Conference on (Conf. Publ. No. 455) Swansea, UK Sep. 1-4, 1998, London, UK, vol. 1, Sep. 1, 1998, 6 pages.
Pires, et al., "Robot Trajectory Planning Using Multi-objective Genetic Algorithm Optimization," 2004, Genetic and Evolutionary Computation—GECCO 2004, pp. 615-626 (Year: 2004).
Ratliff, et al., "CHOMP: Gradient Optimization Techniques for Efficient Motion Planning", 2009 IEEE International Conferenced on Robotics and Automation, Kobe, Japan, May 12-17, 2009, 6 pages.
Rodriguez et al., "Planning manipulation movements of a dual-arm system considering obstacle removing". Robotics and Autonomous Systems, Elsevier Science Publishers, vol. 62, No. 12, pp. 1816-1826; Aug. 1, 2014.
S. Saravana Perumaal et al: "Automated Trajectory Planner of Industrial Robot for Pick-and-Place Task", International Journal of Advanced Robotic Systems, vol. 10, No. 2, Jan. 1, 2013.
Schwesinger, "Motion Planning n Dynamic Environments with Application to Self-Driving Vehicles", Dr. Andreas Krause, Jan. 1, 2017, XP093029842.
Second Office Action issued in Japanese Patent Application No. 2017-557268, Mailed Date: Feb. 26, 2019, 5 pages.
Sicilliano et al. "Robotics. Modelling, Planning and Control", Chapter 12: Motion Planning, pp. 523-559, 2009.
Sonja Macfarlane et al: "Jerk-Bounded Manipulator Trajectory Planning: Design for Real-Time Applications", IEEE Transactions on Robotics and Automation, IEEE Inc, New York, US, vol. 19, No. 1, Feb. 1, 2003 (Feb. 1, 2003), XP011079596, ISSN: 1042-296X.
Taiwanese First Office Action—Application No. 106119452 dated Jun. 18, 2021, 25 pages.
Zhen Yang et al: "Multi-objective hybrid algorithms for layout optimization in multi-robot cellular manufacturing systems", Knowledge-Based Systems, Elsevier, Amsterdam, NL, vol. 120, Jan. 3, 2017, 12 pages.
Corrales, J.A. , et al., Safe Human-robot interaction based on dynamic sphere-swept line bounding volumes, Robotic and Computer-Integrated Manufacturing 27 (2011) 177-185, 9 page.
Johnson, David E., et al., "Bound Coherence for Minimum Distance Computations", Proceedings of the 1999 IEEE International Conference on Robotics and Automation, May 1999.
Stilman, Mike , et al., "Manipulation Planning Among Movable Obstacles", Proceedings of the IEEE Int. Conf. on Robotics and Automation, Apr. 2007.
Final Office Action for U.S. Appl. No. 17/506,364, mailed Aug. 25, 2023, 55 pages.
Non-Final Office Action Issued in U.S. Appl. No. 17/270,597, mailed Aug. 18, 2023, 25 pages.
Office Action, ROC (Taiwan) Pat. Appln. No. 108130161 and Search Report—APP.108130161—mailed Sep. 19, 2023.
Final Office Action Issued in U.S. Appl. No. 17/270,597, mailed Oct. 27, 2023, 29 pages.
International Search Report and Written Opinion for PCT/US2023/069383 dated Oct. 20, 2023, pp. 11.
International Search Report and Written Opinion for PCT/US2023/074143 dated Jan. 4, 2024, 13 pages.
Non-Final Office Action Issued in U.S. Appl. No. 17/604,285, mailed Nov. 21, 2023, 28 pages.
Notice of Reasons for Refusal dated Nov. 27, 2023, for Japanese Application No. 2021-561986, 10 pages.
Oleynikova, et al., "Singed Distance Fields: A Natural Representation for Both Mapping and Planning", 2016, 7 pages.
Taiwanese First Office Action—Application No. 109120779 dated Nov. 9, 2023, 11 pages.
2nd Examination Report mailed Apr. 3, 2025 in EP App No. 20832308.9, 12 pages.
A General Method for Sensor Planning in Multi-Sensor Systems: Extension to Random Occlusion, Anurag Mittal et al., IJCV, 2008, pp. 31-52 (Year: 2008).
Can You See Me Now? Sensor Positioning for Automated and Persistent Surveillance, Yi Yao et al., IEEE, 2010, pp. 101-115 ( Year: 2010).
Communication Pursuant to Article 94(3) EPC issued in European Application No. 21772200.8-1201 dated Apr. 8, 2025, 6 pages.
Computing Occlusion-Free Viewpoints, Konstantinos Tarabanis et al, IEEE, 1996, pp. 279-292 (Year: 1996).
Dynamic Reconfiguration in Camera Networks: A Short Survey, Claudio Piciarelli et al., IEEE, 2016, pp. 965-977 (Year: 2016).
Holger Taubig et al: "Real-time swept volume and distance computation for self collision detection", Intelligent Robots and Systems (IROS), 2011 IEEE/RSJ International Conference On, IEEE, Sep. 25, 2011, pp. 1585-1592.
Non Final Office Action for U.S. Appl. No. 17/918,627, mailed Mar. 18, 2025, 32 pages.
Non Final Office Action for U.S. Appl. No. 18/039,814, mailed Mar. 3, 2025, 42 pages.
Notice of Reasons for Refusal for Japanese Patent Application No. 2024-065096, mailed Mar. 21, 2025, 8 pages.
Object Placement Estimation with Occlusions and Planning of Robotic Handling Strategies, Wataru Miyazaki et al., IEEE, 2017, pp. 602-607 (Year: 2017).
Occlusion-Free Path Planning with a Probabilistic Roadmap, Matthew A. Baumann et al., IEEE, 2008, pp. 2151-2156 (Year: 2008).
Operation of an Intelligent Space with Heterogeneous Sensors, Doojin Kim, Aug. 2014, pp. i-135 (Year: 2014).
Real-Time Visual Tracking of 3-D Objects with Dynamic Handling of Occlusion, P. Wunsch et al., IEEE, 1997, pp. 2868-2873 ( Year: 1997).
Sensor Planning for 30 Object Search, Yiming Ye, IDEAL., 1999, pp. 145-168 (Year: 1999).

(56) References Cited

OTHER PUBLICATIONS

Tracking Targets Using Multiple Robots: The Effect of Environment Occlusion, Boyoon Jung et al., Autonomous Robots, 2002, pp. 191-205 (Year: 2002).
View planning for exploration—sensors, Peng Peng Wang et al., Advanced Robotics, 2007, pp. 771-792 (Year: 2007).
Vision for robotic object manipulation in domestic settings, Danica Kragic et al., Elsevier, 2005, pp. 85-100 (Year: 2005).
Visual Motion Planning for Mobile Robots, Hong Zhang et al., IEEE, 2002, pp. 199-208 (Year: 2002).
Hassan, et al., "An Approach to Base Placement for Effective Collaboration of Multiple Autonomous Industrial Robots," 2015 IEEE International Conference on Robotics and Automation (ICRA}, pp. 3286-3291 (Year: 2015).
Hassan, et al., "Simultaneous area partitioning and allocation for complete coverage by multiple autonomous industrial robots," 2017, Autonomous Robots 41, pp. 1609-1628 (Year: 2017).
Hassan, et al., "Task Oriented Area Partitioning and Allocation for Optimal Operation of Multiple Industrial Robots in Unstructured Environments," 2014, 13th International Conference on Control, Automation, Robotics & Vision (ICARCV 2014), pp. 1184-1189.
International Search Report and Written Opinion for PCT/US2019/016700, Mailed Date: May 20, 2019, 14 pages.
International Search Report and Written Opinion for PCT/US2019/023031, Mailed Date: Aug. 14, 2019 in 19 pages.
International Search Report and Written Opinion for PCT/US2019/064511, Mailed Date: Mar. 27, 2020, 10 pages.
International Search Report and Written Opinion for PCT/US2021/061427, mailed Apr. 29, 2022, 14 pages.
International Search Report and Written Opinion issued in PCT Application No. PCT/2020/034551, Mailed Date: Aug. 31, 2020, 18 pages.
International Search Report and Written Opinion issued in PCT Application No. PCT/US2016/012204; Mailed Date: Mar. 21, 2016, 10 pages.
International Search Report and Written Opinion issued in PCT Application No. PCT/US2017/036880; Mailed Date: Oct. 10, 2017, 15 pages.
International Search Report and Written Opinion issued in PCT Application No. PCT/US2019/045270; Mailed Date: Nov. 25, 2019, 11 pages.
International Search Report and Written Opinion issued in PCT/US2019/012209, Mailed Date: Apr. 25, 2019, 24 pages.
International Search Report and Written Opinion, mailed Apr. 22, 2021, for International Application No. PCT/US2021/013610, 9 pages.
International Search Report and Written Opinion, Mailed Date: Jul. 29, 2020, in PCT/US2020/028343, 11 pages.
International Search Report and Written Opinion, Mailed Date: Nov. 23, 2020, for PCT/US2020/047429, 11 Pages.
International Search Report and Written Opinion, Mailed Date: Sep. 29, 2020 for PCT/US2020/039193, 9 pages.
Invitation to Pay Additional Fees and, Where Applicable, Protest Fee issued in PCT/US2017/036880, Mailed Date: Aug. 14, 2017, 2 pages.
Jan Mattmuller et al: "Calculating a near time-optimal jerk-constrained trajectory along a specified smooth path", The International Journal of Advanced Manufacturing Technology, Springer, Berlin, DE, vol. 45, No. 9-10, Apr. 19, 2009.
Japanese Office Action, Japanese Application No. 2021-576425, Mar. 13, 2023, 14 pages.
Kalawoun, "Motion planning of multi-robot system for airplane stripping," 2019, Universite Clermont Auvergne (Year: 2019).
Kapanoglu, et al., "A pattern-based genetic algorithm for multi-robot coverage path planning minimizing completion time," 2012, Journal of Intelligent Manufacturing 23, pp. 1035-1045 (Year: 2012).
Klampfl Erica et al: "Optimization of workcell layouts in a mixed-model assembly line environment", International Journal of Flexible Manufacturing Systems, Kluwer Academic Publishers, Boston, vol. 17, No. 4, 23 pages, Oct. 10, 2006.
Li, et al., "A Novel Cost Function for Decision-Making Strategies in Automotive Collision Avoidance Systems", 2018 IEEE, ICVES, 8 pages.
Lin Jianjie et al: "An Efficient and Time-Optimal Trajectory Generation Approach for Waypoints Under Kinematic Constraints and Error Bounds", 2018 IEEE/RSJ International Conference on Intelligent Robots and Systems (IROS), IEEE, Oct. 1, 2018.
Long Tao et al: "Optimization on multi-robot workcell layout in vertical plane", Information and Automation (ICIA), 2011 IEEE International Conference on, IEEE, Jun. 6, 2011, 6 pages.
Murray et al., "Robot Motion Planning on a Chip", Robotics: Science and Systems, Jan. 1, 2016, 9 pages.
Non Final Office Action for U.S. Appl. No. 16/883,376, mailed Sep. 27, 2022, 26 pages.
Non-Final Office Action Issued in U.S. Appl. No. 16/240,086, Mailed Date: Feb. 11, 2021, 79 pages.
Non-Final Office Action Issued in U.S. Appl. No. 16/268,290, Mailed Date: Jan. 27, 2021, 54 pages.
Non-Final Office Action Issued in U.S. Appl. No. 16/268,290, Mailed Date: Jun. 17, 2021, 35 pages.
Non-Final Office Action Issued in U.S. Appl. No. 16/308,693, Mailed Date: Dec. 11, 2020, 17 pages.
Non-Final Office Action Issued in U.S. Appl. No. 16/308,693, Mailed Date: Jun. 1, 2020, 16 pages.
Chen, Chao , Motion Planning for Nonholonomic Vehicles with Space Exploration Guided Heuristic Search, 2016, IEEE.com, Whole Document, 140 pages.
Hauck, Scott , et al., "Configuration Compression for the Xilinx XC6200 FPGA", IEEE Transactions on Computer—Aided Design of Integrated Circuits and Systems, vol. 18, No. 8; Aug. 1999.
Kavraki, L.E. , et al., "Probabilistic Roadmaps for Path Planning in High-Dimensional Configuration Spaces", IEEE Transactions on Robotics and Automation, IEEE Inc.; vol. 12, No. 4, pp. 566-580; Aug. 1, 1996.
Non-Final Office Action Issued in U.S. Appl. No. 18/221,027, mailed Feb. 29, 2024, 13 pages.
Non-Final Office Action Issued in U.S. Appl. No. 18/222,801, mailed Feb. 15, 2024, 44 pages.
Notice of Reasons for Refusal. Japanese Application No. 2023-524134, dated Mar. 12, 2024, 6 pages.
Communication Pursuant to Article 94(3) EPC, dated Jul. 12, 2023, for European Application No. 19 893 874.8-1205, 5 pages.
Final Office Action for U.S. Appl. No. 17/682,732, mailed Jul. 7, 2023, 46 pages.
First Office Action issued in Chinese No. 201980055188.0 with English translation, Mailed Date: Jul. 1, 2023, 16 pages.
First Office Action issued in Chinese No. 201980080759.6 with English translation, Mailed Date: Jun. 28, 2023, 4 pages.
First Office Action issued in Chinese No. 202080055382.1 with English translation, Mailed Date: Jun. 28, 2023, 30 pages.
International Search Report and Written Opinion for PCT/US2023/017296, mailed Jul. 27, 2023, 10 pages.
International Search Report and Written Opinion for PCT/US2023/064012, mailed Jul. 10, 2023, 15 pages.
Notice of Reasons for Refusal for Japanese Patent Application No. 2022-562247, mailed Sep. 25, 2023, 7 pages.
Notice of Reasons for Refusal. Japanese Application No. 2022-556467, dated Sep. 28, 2023, 10 pages.
Notice of Allowance, Japanese Application No. 2023-532462, dated Oct. 29, 2024, 3 pages.
Barral D et al: "Simulated Annealing Combined With a Constructive Algorithm for Optimising Assembly Workcell Layout", The International Journal of Advanced Manufacturing Technology, Springer, London, vol. 17, No. 8, Jan. 1, 2001, 10 pages.
Bharathi Akilan et al: "Feedrate optimization for smooth minimum-time trajectory generation with higher order constraints", The International Journal of Advanced Manufacturing Technology, vol. 82, No. 5, Jun. 28, 2015 (Jun. 28, 2015), pp. 1029-1040.
Communication Pursuant to Article 94(3) EPC, issued in European Application No. 17811131.6, Mailed Date: Jun. 16, 2020, 5 pages.

(56) References Cited

OTHER PUBLICATIONS

Communication Pursuant to Article 94(3) EPC, issued in European Application No. 18209405.2, Mailed Date: Nov. 23, 2020, 4 pages.
Dong et al: "Feed-rate optimization with jerk constraints for generating minimum-time trajectories", International Journal of Machine Tool Design and Research, Pergamon Press, Oxford, GB, vol. 47, No. 12-13, Aug. 9, 2007 (Aug. 9, 2007), pp. 1941-1955.
European Search Report dated Jul. 23, 2021, for European Application No. 19851097.6, 15 pages.
European Search Report issued in European Application No. 19771537.8, Mailed Date: Mar. 29, 2021, 8 pages.
European Search Report, Mailed Date: Nov. 17, 2020 for EP Application No. 16743821.7, 4 pages.
Extended EP Search Report mailed Jul. 18, 2022 EP App No. 20832308.9-1205, 10 pages.
Extended EP Search Report mailed Jul. 25, 2022 EP App No. 20857383.2-1205, 10 pages.
Extended EP Search Report mailed May 10, 2023, EP App No. 20818760.9-1012, 9 pages.
Extended EP Search Report mailed Nov. 7, 2022, EP App No. 21744840.6-1205, 14 pages.
Extended European Search Report issued in European Application No. 17811131.6, Mailed Date: Apr. 24, 2019, 16 pages.
Extended European Search Report issued in European Application No. 18209405.2, Mailed Date: Aug. 2, 2019, 9 pages.
Extended European Search Report issued in European Application No. 19893874.8, Mailed Date: Jan. 5, 2022, 13 pages.
Turrillas, Alexander Martin, "Improvement of a Multi-Body Collision Computation Framework and Its Application to Robot (Self-) Collision Avoidance", German Aerospace Center (DLR). Master's Thesis, Jun. 1, 2015, 34 pages.
Extended European Search Report, Mailed Date: Apr. 10, 2018 for EP Application No. 16743821.7, in 9 pages.
Final Office Action Issued in U.S. Appl. No. 16/268,290, Mailed Date: Apr. 21, 2021, 58 pages.
Final Office Action mailed Aug. 2, 2021 for U.S. Appl. No. 16/240,086 in 66 pages.
Final Office Action mailed Sep. 7, 2022, for U.S. Appl. No. 16/909,096, 54 pages.
First Office Action and Search Report issued in Chinese No. 202080040382.4 with English translation, Mailed Date: May 26, 2023, 15 pages.
First Office Action issued in Chinese No. 201680006941.3 with English translation, Mailed Date: Sep. 29, 2019, 16 pages.
First Office Action issued in Chinese No. 201980024188.4 with English translation, Mailed Date: Feb. 22, 2023, 28 pages.
First Office Action issued in Chinese No. 202080059714.3 with English translation, Mailed Date: May 24, 2023, 24 pages.
First Office Action issued in Japanese Patent Application No. 2017-557268, Mailed Date: Aug. 7, 2018, 15 pages.
Gasparetto A et al: "Experimental validation and comparative analysis of optimal time-jerk algorithms for trajectory planning", Robotics and Computer Integrated Manufacturing, Elsevier Science Publishers BV. , Barking, GB, vol. 28, No. 2, Aug. 5, 2011.
Gasparetto et al: "A new method for smooth trajectory planning of robot manipulators", Mechanism and Machine Theory, Pergamon, Amsterdam, NL, vol. 42, No. 4, Jan. 26, 2007.
Haschke R et al: "On-Line Planning of Time-Opti.mal, Jerk-Limited Trajectories", Internet Citation, Jul. 1, 2008 (Jul. 1, 2008), pp. 1-6, XP00278977 6.
Hassan, "Modeling and Stochastic Optimization of Complete Coverage under Uncertainties in Multi-Robot Base Placements," 2016, Intelligent Robots and Systems (IROS} (Year: 2016).
Atay, Nuzhet , et al., "A Motion Planning Processor on Reconfigurable Hardware", All Computer Science and Engineering Research, Computer Science and Engineering; Report No. WUCSE-2005-46; Sep. 23, 2005.
Murray, Sean , et al., "The microarchitecture of a real-time robot motion planning accelerator", 2016 49th Annual IEEE/ACM International Symposium on Microarchitecture (Micro), IEEE, Oct. 15, 2016, 12 pages.
Pan, Jia , et al., Efficient Configuration Space Construction and Optimization for Motion Planning, 2015, Research Robotics, Whole Document, 12 pages.
Pobil, Angel P, et al., "A New Representation for Collision Avoidance and Detection", Proceedings of the 1992 IEEE, XP000300485, pp. 246-251.
Sato, Yuichi , et al., "Efficient Collision Detection using Fast Distance-Calculation Algorithms for Convex and Non-Convex Objects", Proceeding of the 1996 IEEE, XP-000750294, 8 pages.
Chinese Office Action dated Jun. 28, 2025 for Chinese Application No. 202180010425.9, 14 pages.
EP Search Report mailed Jul. 11, 2025, in European Patent Application No. 23785230.6-1201, 16 pages.
First Office Action dated Jul. 4, 2025 for Taiwan Application No. 110144936, with English translation.
Japanese Office Action for Japanese Patent Application No. 2024-553368, mailed Jul. 15, 2025 (with English Translation) 15 pages.
Taiwan Office Action issued in connection with related Taiwan Patent Application No. 110139594 dated Jul. 4, 2025.
Final Office Action for U.S. Appl. No. 17/918,627 mailed Oct. 2, 2025, 20 pages.
Japanese Decision of Refusal for JP 2024-065096, mailed Sep. 16, 2025, 4 pages (with English Translation).
Notice of Reasons for Refusal for Japanese Patent Application No. 2025-504861, mailed Aug. 29, 2025, 10 pages.
Czarnecki C A ED—Institute of Electrical and Electronics Engineers: "A Hierarchical Approach to the Collision Free Operation Of A Multi-Robot Workcell", Proceedings of the Mediterranean Electrotechnical Conference. Antalya, turkey; vol. 2, Apr. 12, 1994, pp. 687-690, XP000506206.
EP Search Report mailed Oct. 17, 2025 in EP App No. 23836205.7, 11 pages.
Nekvinda Michal et al: "Contingent Planning for Robust Multi-Agent Path Finding",2021 IEEE 33rd International Conference on Tools With Artificial Intelligence (ICTAI), IEEE, Nov. 1, 2021 (Nov. 1, 2021), pp. 487-492, XP034055551,DOI: 10.1109/ICTAI52525.2021.00079.
Non Final Office Action for U.S. Appl. No. 18/520,298, mailed Sep. 18, 2025, 44 pages.
Chinese Office Action dated May 28, 2025, for Chinese Application No. 202180022111.0, 22 pages (EngliSh translation).
Communication Pursuant to Article 94(3) EPC issued in European Application No. 19751574.5-1201. dated Jun. 18, 2025, 7 pages.
Zhanxia Zhu, et al., "Obstacle Avoidance Path Planning of Space Redundant Manipulator Based on a Collision Detection Algorithm". Journal of Northwestern Polytechnical University, Issue 01. Feb. 15, 2020.
Chinese Office Action dated Apr. 30, 2025 for Chinese Application No. 202180028405.4 in 20 pages.
EP Search Report mailed Jun. 2, 2025 in App. No. 23767682.0-1201 / 4489947 PCT/US2023064012, 13 pages.
European Examination Report dated May 22, 2025, Application No. 21789270.2, 11pages.
First Office Action issued for the Chinese Patent Application No. 202380051908.2, dated May 21, 2025, 28 pages.
Papachristos Christos et al: "Localization uncertainty-aware autonomous exploration and mapping with aerial robots using receding horizon path-planning", Autonomous Robots, NL, vol. 43, May 30, 2019, pp. 2131-2161.
Ping Li et al., "Research on trajectory planning of a two robot coordinated system", Modern Manufacturing Engineering, 11, pp. 25-29.
Decision of Refusal in Corresponding in Japanese patent Application No. 2024-553368, mailed Nov. 13, 2025.
First Office Action issued for the Chinese Patent Application No. 202180073076.5, dated Jan. 23, 2026.
Non Final Office Action for U.S. Appl. No. 18/854,236, mailed Jan. 15, 2026, 82 pages.

(56) References Cited

OTHER PUBLICATIONS

Communication Pursuant to Article 94(3) EPC issued in European Application No. 23767682.0-1201, dated Mar. 30, 2026, 9 pages.

* cited by examiner

MOTION PLANNING AND CONTROL FOR ROBOTS IN SHARED WORKSPACE EMPLOYING STAGING POSES

BACKGROUND

Technical Field

The present disclosure generally relates to robot motion planning and control of robots, and in particular to systems and methods that perform collision detection via processor circuitry to produce motion plans to efficiently drive robots and the like in shared workspaces.

Description of the Related Art

Motion planning is a fundamental problem in robot control and robotics. A motion plan specifies a path that a robot can follow to transition from a starting state or current state to a goal state, typically to complete a task without colliding with any obstacles in an operational environment or with a reduced possibility of colliding with any obstacles in the operational environment. Challenges to motion planning involve the ability to perform motion planning at very fast speeds even as characteristics of the environment change. For example, one or more characteristics such as location and/or orientation of one or more obstacles in the environment may change over time during a runtime of the robot(s). Challenges also include generating motion plans that allow robots to complete tasks efficiently for instance with respect to a duration of time to complete the task(s) and/or with respect energy expended to complete the task(s). Challenges further include performing motion planning using relatively low cost equipment, at relative low energy consumption, and with limited amounts of storage (e.g., memory circuits, for instance on processor chip circuitry).

One problem in robotics is operation of two or more robots in a shared workspace (workspaces are commonly referred to as workcells or environments), for example where the robots or robotic appendages of the robots may interfere with one another during the performance of tasks.

One approach to operating multiple robots in a common workspace can be called a task-level approach. The task level approach may employ teach-and-repeat training. An engineer may ensure that the robots are collision-free by defining shared parts of the workspace, and programming the individual robots such that only one robot is in a shared workspace at any given point in time. For example, when a first robot begins to move into a workspace, the first robot sets a flag. A controller (e.g., programmed logic controller (PLC)) reads the flag and prevents other robots from moving into the shared workspace until the first robot de-asserts the flag on exiting the workspace. This approach is intuitive, simple to understand, implement, and troubleshoot. However, this approach necessarily has low work throughput since the use of task-level de-confliction usually leads to at least one of the robots being idle for significant portions of time, even if it would technically be possible for the idle robot to be performing useful work in the shared workspace.

Another approach to operating multiple robots in a common workspace employs offline planning (e.g., during a configuration time preceding the runtime), in order to achieve higher work throughput than in the afore-described task-level de-confliction based approach. To do so, a system may attempt to solve a planning problem in a combined joint space of all robots or robotic appendages. For example, if two 6 degrees-of-freedom (DOF) appendages are in a workspace, a 12 DOF planning problem must be solved. While this approach allows higher performance, the planning can be extremely time consuming. 12 DOF problems appear too large for conventional motion planning algorithms to solve using currently available architectures.

One strategy to address these problems is to optimize motion for a first robot/robotic appendage, and then manually optimize motion for a second robot/robotic appendage. This may employ iteratively simulating motion to ensure that the robots/robotic appendages do not collide with one another, which may take many hours of computation time. Additionally, if a modification to the workspace results in a change in a trajectory of one of the robots/robotic appendages, the entire workflow must be re-validated.

BRIEF SUMMARY

The structures and algorithms described herein advantageously employ staging poses to facilitate the operation of two or more robots operating in a shared workspace or workcell, preventing or at least reducing the risk that robots or robotic appendages of robots will collide with one another while operating to efficiently move one or more robots respectively to one or more goals to perform respective tasks in the shared workspace.

The structures and algorithms described herein enable high degree of freedom robots to avoid collisions and continue efficiently working in a changing, shared environment. An efficient planning method can be accelerated with or without hardware acceleration, to produce collision-free motion plans in milliseconds. Ultrafast "real-time" motion planning allows robot paths to be decided at runtime during task execution, without the need for training or time-intensive path optimization. Such can advantageously allow coordination of multiple robots in a shared workspace in an efficient manner.

The structures and algorithms described herein may, in at least some implementations, result in efficient, collision-free robot movement for a robot in a workspace shared by multiple robots. Collision-free motion may result for all parts (e.g., base, robotic appendages, end-of-arm tools, end effectors) of the robots, even when operating at high velocity.

The structures and algorithms described herein may advantageously reduce programming effort for multi-robot workspaces, by performing autonomous planning, for example during a runtime of one or more robots. In at least some implementations, operators do not need to program any safety zones, time synchronization, or joint-space trajectories. Input may be limited to a description of the task(s) to be performed or goal poses or goals and kinematic models of the robots. Input may additionally include representations of fixed objects, or optionally objects with unpredictable trajectories (e.g., people).

The structures and algorithms described herein may advantageously dynamically perform motion planning, including identifying (e.g., selecting, generating) one or more staging poses for a given robot to advantageously position or configure the given robot whose path is blocked or will be blocked, for example blocked by one or more other robots, monitoring the other robots, and moving the given robot toward a goal in response to the path becoming unblocked or cleared. The staging pose can be identified using various heuristics to efficiently position or configure the given robot to complete its task once its path becomes unblocked or cleared.

The structures and algorithms described herein may, in at least some implementations, allow robots to share information, for example via a non-proprietary communications channel (e.g., Ethernet connection), which may advantageously facilitate integration of robots in a shared workspace, even robots from different manufacturers.

The structures and algorithms described herein may, in at least some implementations, operate without cameras or other perception sensors. In at least some implementations, coordination between the robots relies on the kinematic models of the robots, the ability of the robots to communicate their respective motion plans, and geometric models of a shared workspace. In other implementations, visual or other perception may optionally be employed, for example to avoid humans or other dynamic obstacles, for instance other robots, that might enter or occupy portions of the shared workspace.

A wide variety of algorithms are used to solve motion planning problems. Each of these algorithms typically need to be able to determine whether a given pose of a robot or a motion from one pose to another pose results in a collision, either with the robot itself or with obstacles in the environment. Collision assessment or checking can be performed "in software" using processors that execute processor-executable instructions from a stored set of processor-executable instructions, to perform an algorithm. Collision assessment or checking can be performed "in hardware" using a set of dedicated hardware circuits (e.g., collision checking circuits implemented in a field programmable gate array (FPGA), application specific integrated circuit (ASIC)). Such circuits may, for example, represent volumes swept by a robot/robotic appendage or portion thereof (i.e., swept volumes) during a respective motion or transition between two states. The circuits may, for example, produce a Boolean evaluation indicative of whether a motion will collide with any obstacles, where at least some of the obstacles represent volumes swept in executing a motion or transition by the other robots operating in the shared workspace.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
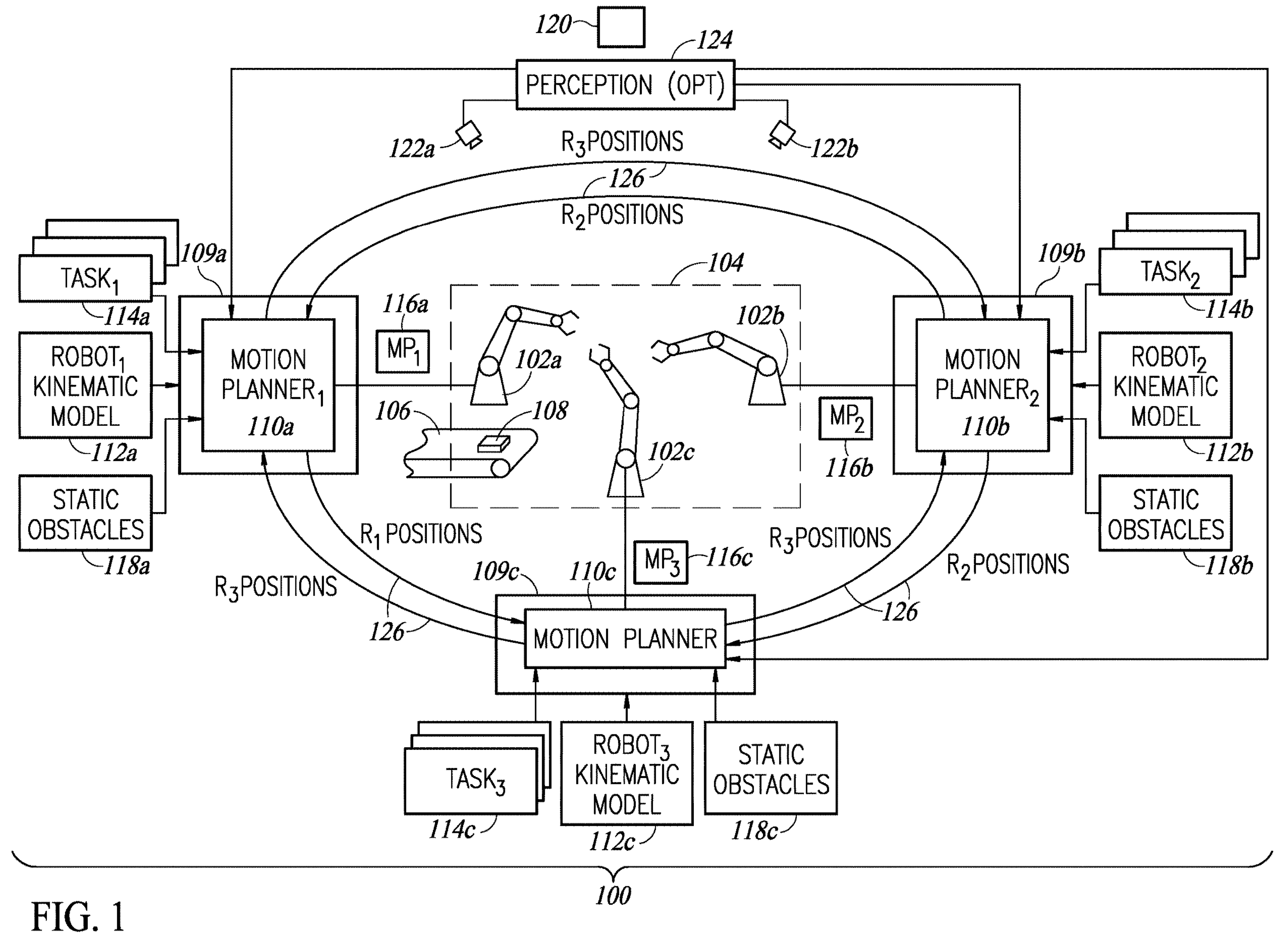
FIG. 1 is a schematic diagram of a robotic system that includes a plurality of robots that operate in a shared workspace to carry out tasks, and which includes motion planners that dynamically produce motion plans for the robots that take into account the planned motions of the other ones of the robots, and which optionally includes a perception subsystem, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, robots, actuator systems, and/or communications networks have not been shown or described in detail to avoid unnecessarily obscuring descriptions of the implementations. In other instances, well-known computer vision methods and techniques for generating perception data and volumetric representations of one or more objects and the like have not been described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or to "one embodiment" or "an embodiment" means that a particular feature, structure or characteristic described in connection with the embodiment is included in at least one implementation or in at least one implementation embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in this specification and the appended claims, the terms determine, determining and determined when used in the context of whether a collision will occur or result, mean that an assessment or prediction is made as to whether a given pose or movement between two poses via a number of intermediate poses will or may result in a collision between a portion of a robot and some object (e.g., another portion of the robot, a portion of another robot, a persistent obstacle, a transient obstacle, for instance a person).

As used in this specification and the appended claims, the term robot refers to a machine that is capable of carrying out a complex series of actions either autonomously or semi-autonomously. Robots can take the form of a robot with a base, a robotic appendage movable coupled to the base, and an end effector or end-of-arm implement carried by the robotic appendage, along with one or more actuators to drive the movement thereof. Such robots may or may not resemble humans. Robots can alternatively or additionally take the form of vehicles (e.g., autonomous or semi-autonomous vehicles).

The headings and Abstract of the Disclosure provided herein are for convenience only and do not interpret the scope or meaning of the implementations or embodiments.

FIG. 1 shows a robotic system 100 which includes a plurality of robots 102*a*, 102*b*, 102*c* (collectively 102) that operate in a shared workspace 104 to carry out tasks employing one or more staging poses to better position a robot when a trajectory or path of the robot is or likely will be blocked, for example blocked by another robot, and/or where a suitable and unblocked trajectory or path cannot not be found, according to one illustrated implementation. Such can improve robot operation in a variety of ways, for example reducing overall time to complete tasks, allowing completion of tasks that otherwise could not be completed, reducing overall energy usage, reducing the occurrence of collisions, and/or reducing consumption of computational resources.

The robots 102 can take any of a large variety of forms. Typically, the robots will take the form of, or have, one or more robotic appendages. The robots 102 may include one or more linkages with one or more joints, and actuators (e.g., electric motors, stepper motors, solenoids, pneumatic actuators or hydraulic actuators) coupled and operable to move the linkages in response to control or drive signals. Pneumatic actuators may, for example, include one or more pistons, cylinders, valves, reservoirs of gas, and/or pressure sources (e.g., compressor, blower). Hydraulic actuators may, for example, include one or more pistons, cylinders, valves, reservoirs of fluid (e.g., low compressibility hydraulic fluid), and/or pressure sources (e.g., compressor, blower). The robotic system 100 may employ other forms of robots 102, for example autonomous or semi-autonomous vehicles.

The shared workspace 104 typically represents a three-dimensional space in which the robots 102*a*-102*c* may operate and move, although in certain limited implementations the shared workspace 104 may represent a two-dimensional space. The shared workspace 104 is a volume or area in which at least portions of the robots 102 may overlap in space and time or otherwise collide if motion is not controlled to avoid collision. It is noted that the workspace 104 is different than a respective "configuration space" or "C-space" of the robot 102*a*-102*c*, which is described below, for example with reference to FIGS. 3A and 3B.

As explained herein, a robot 102*a* or portion thereof may constitute an obstacle when considered from a viewpoint of another robot 102*b* (i.e., when motion planning for another robot 102*b*). The shared workspace 104 may additionally include other obstacles, for example pieces of machinery (e.g., conveyor 106), posts, pillars, walls, ceiling, floor, tables, humans, and/or animals. The shared workspace 104 may additionally include one or more work items or work pieces 108 which the robots 102 manipulate as part of performing tasks, for example one or more parcels, packaging, fasteners, tools, items or other objects.

Figure 2:
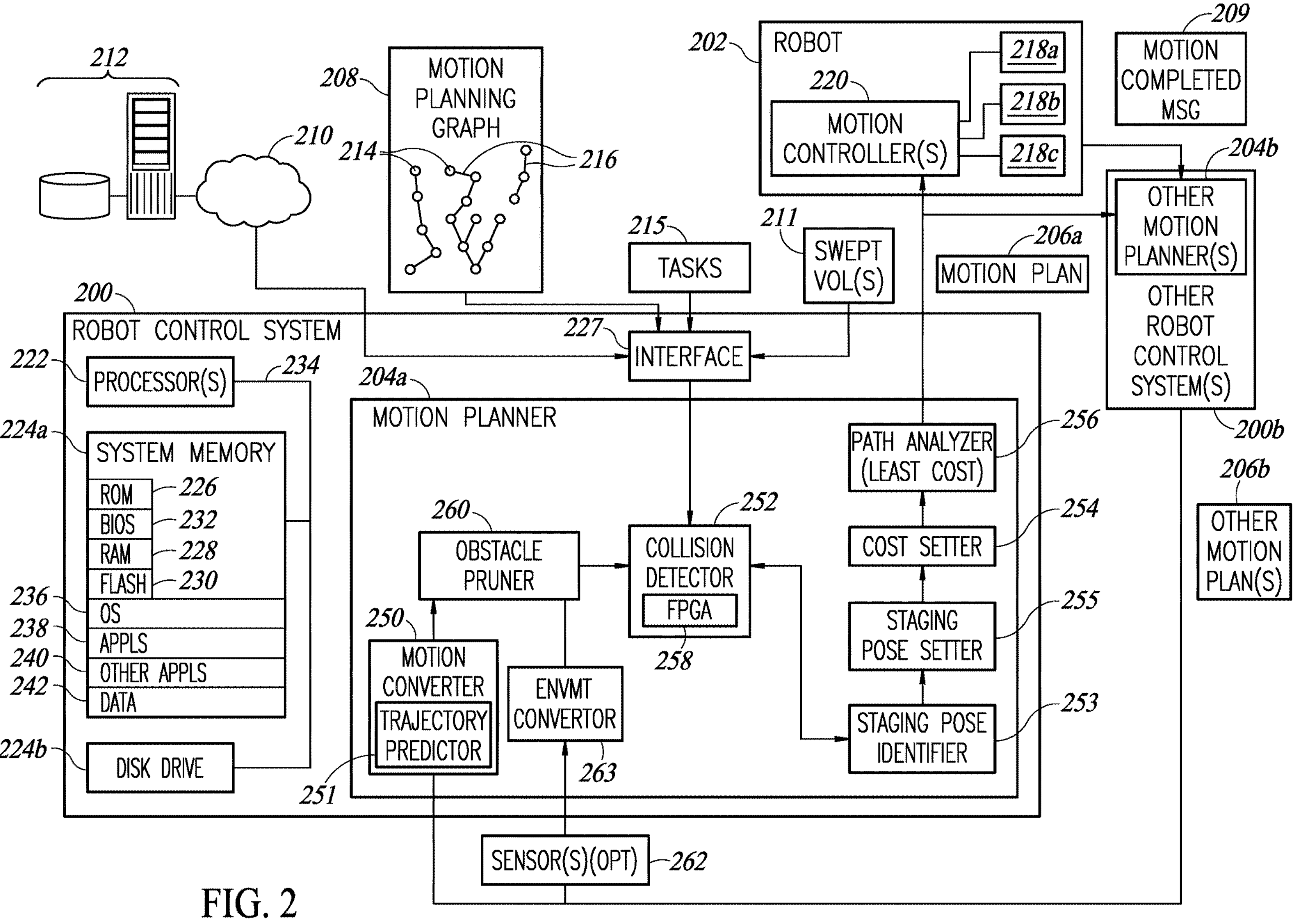
FIG. 2 is a functional block diagram of an environment in which a first robot is controlled via a robot control system that includes a motion planner, optionally provides motion plans to other motion planners of other robots, and further includes a source of planning graphs that can be separate and distinct from the motion planners, according to one illustrated implementation.

The robotic system 100 may include one or more robot control systems 109*a*, 109*b*, 109*c*, (three shown, collectively 109) which include one or more motion planners, for example a respective motion planner 110*a*, 110*b*, 110*c* (three shown, collectively 110) for each of the robots 102*a*, 102*b*, 102*c*, respectively. In at least some implementations, a single motion planner 109 may be employed to generate motion plans for two, more, or all robots 102. The motion planners 110 are communicatively coupled to control respective ones of the robots 102. The motion planners 110 are also communicatively coupled to receive various types of input, for example including robot kinematic models 112*a*, 112*b*, 112*c* (collectively 112) and/or task messages 114*a*, 114*b*, 114*c* (collectively 114). The motion planners 110 are optionally communicatively coupled (not illustrated in FIG. 1) to receive motion plans or other representations of motions 116*a*, 116*b*, 116*c* (collectively 116) for the other robots 102 operating in the shared workspace 104. The robot geometric models 112 define a geometry of a given robot 102, for example in terms of joints, degrees of freedom, dimensions (e.g., length of linkages), and/or in terms of the respective C-space of the robot 102. (As illustrated in FIG. 2, the conversion of robot geometric models 112 to motion planning graphs may occur during a configuration time that occurs before runtime of the robot or before task execution by the robot, performed for example by a processor-based system that is distinct and separate from the robotic system 100 using any of a variety of techniques.) The task messages 114 specify tasks to be performed, for example in terms of goals (e.g., goal locations, goal poses or end poses, goal configurations or goal states and/or end configurations or end states). The performance of tasks can also involve the transition or movement through a number of intermediate poses, intermediate configurations or intermediate states of the respective robot 102. Poses, configurations or states may, for example, be defined in a configuration space (C-space) of the robot, for instance in terms of joint positions and joint angles/rotations (e.g., joint poses, joint coordinates) of the respective robot 102. Goal locations can be specified in real world coordinates (e.g., 2-space or two dimensional space or 3-space or three-dimensional space) of a workspace or alternatively specified in terms of C-space.

The motion planners 110 are optionally communicatively coupled to receive as input static object data 118*a*, 118*b*, 118*c* (collectively static object data 118). The static object data 118 is representative (e.g., size, shape, position, space occupied) of static objects in the workspace 104, which may, for instance, be known a priori. Static objects may, for example, include one or more of fixed structures in the workspace, for instance posts, pillars, walls, ceiling, floor, conveyor 106. Since the robots 102 are operating in a shared workspace, the static objects will typically be identical for each robot. Thus, in at least some implementations, the static object data 118*a*, 118*b*, 118*c* supplied to the motion planners 110 will be identical. In other implementations, the static object data 118*a*, 118*b*, 118*c* supplied to the motion planners 110 may differ for each robot, for example based on a position or orientation of the robot 102 in the environment or an environmental perspective of the robot 102. Additionally, as noted above, in some implementations, a single motion planner 110 may generate the motion plans for two or more robots 102.

The motion planners 110 are optionally communicatively coupled to receive as input perception data 120, for example provided by a perception subsystem 124. The perception data 120 is representative of static and/or dynamic objects in the workspace 104 that are not known a priori. The perception data 120 may be raw data as sensed via one or more sensors (e.g., cameras 122*a*, 122*b*) and/or as converted to digital representations of obstacles by the perception subsystem 124.

The optional perception subsystem 124 may include one or more processors, which may execute one or more machine-readable instructions that cause the perception subsystem 124 to generate a respective discretization of a representation of an environment in which the robots 102 will operate to execute tasks for various different scenarios.

The optional sensors (e.g., camera 122*a*, 122*b*) provide raw perception information (e.g., point cloud) to perception subsystem 124. The optional perception subsystem 124 may process the raw perception information, and resulting perception data may be provided as a point cloud, an occupancy grid, boxes (e.g., bounding boxes) or other geometric objects, or stream of voxels (i.e., a "voxel" is an equivalent to a 3D or volumetric pixel) that represent obstacles that are present in the environment. The representation of obstacles may optionally be stored in on-chip memory. The perception data 120 may represent which voxels or sub-volumes (e.g., boxes) are occupied in the environment at a current time (e.g., during run time). In some implementations, when representing either a robot or another obstacle in the environment, the respective surfaces of the robot or an obstacle (e.g., including other robots) may be represented as either voxels or meshes of polygons (often triangles). In some cases, it is advantageous to represent the objects instead as boxes (rectangular prisms, bounding boxes, hierarchical data structures, for instance octrees or sphere trees) or other geometric objects. Due to the fact that objects are not randomly shaped, there may be a significant amount of structure in how the voxels are organized; many voxels in an object are immediately next to each other in 3D space. Thus, representing objects as boxes may require far fewer bits (i.e., may require just the x, y, z Cartesian coordinates for two opposite corners of the box). Also, performing intersection tests for boxes is comparable in complexity to performing intersection tests for voxels.

At least some implementations may combine the outputs of multiple sensors and the sensors may provide a very fine granularity voxelization. However, in order for the motion planner to efficiently perform motion planning, coarser voxels (i.e., "processor voxels") may be used to represent the environment and a volume in 3D space swept by the robot 102 or portion thereof when making transitions between various states, configurations or poses. Thus, the optional perception subsystem 124 may transform the output of the sensors (e.g., camera 122*a*, 122*b*) accordingly. At runtime, if the robot control system 200 determines any of the sensor voxels within a processor voxel is occupied, the robot control system 200 considers the processor voxel to be occupied and generates the occupancy grid accordingly.

Various communicative paths are illustrated in FIG. 1 as arrows. The communicative paths may for example take the form of one or more wired communications paths (e.g., electrical conductors, signal buses, or optical fiber) and/or one or more wireless communications paths (e.g., via RF or microwave radios and antennas, infrared transceivers). Notably, each of the motion planners 110*a*-110*c* can be communicatively coupled to one another, either directly or indirectly, to provide the motion plan for a respective one of the robots 102*a*-102*c* to the other ones of the motion planners 110*a*-110*c*. For example, the motion planners 110*a*-110*c* may be communicatively coupled to one another via a network infrastructure, for instance a non-proprietary network infrastructure (e.g., Ethernet network infrastructure) 126. Such may advantageously allow operation of robots from different manufacturers in a shared workspace.

The term "environment" is used to refer to a current workspace of a robot, which is a shared workspace where two or more robots operate in the same workspace. The environment may include obstacles and/or work pieces (i.e., items with which the robots are to interact or act on or act with). The term "task" is used to refer to a robotic task in which a robot transitions from a pose A to a goal pose B preferably without colliding with obstacles in its environment. The goal pose is a pose for the robot to perform the specified task, typically on an object, at a location referred to as the goal location or goal. The task may perhaps involve the grasping or un-grasping of an item, moving or dropping an item, rotating an item, or retrieving or placing an item. The transition from pose A to goal pose B may optionally include transitioning between one or more intermediary poses. The term "scenario" is used to refer to a class of environment/task pairs. For example, a scenario could be "pick-and-place tasks in an environment with a 3-foot table or conveyor and between x and y obstacles with sizes and shapes in a given range." There may be many different task/environment pairs that fit into such criteria, depending on the locations of goals and the sizes and shapes of obstacles.

The motion planners 110 are operable to dynamically produce motion plans 116 to cause the robots 102 to carry out tasks in an environment, while taking into account the planned motions (e.g., as represented by respective motion plans 116 or resulting swept volumes) of the other ones of the robots 102. The motion planners 110 may optionally take into account representations of a priori static object data 118 and/or perception data 120 when producing motion plans 116. The motion planners 110 may advantageously take into account a known or a predicted location, pose and/or state of motion of other robots 102 at a given time, for instance whether or not another robot 102 has completed a given motion or task, and allowing a recalculation of a motion plan based on a motion or task of one of the other robots being completed, for instance making available a previously excluded path or trajectory to choose from.

As described herein, the motion planners 110 employ staging poses to facilitate the efficient operation of two or more robots operating in a shared workspace or workcell, preventing or at least reducing the risk that robots or robotic appendages of robots will collide with one another while efficiently moving one or more of the robots respectively to one or more goals to perform respective tasks in the shared workspace. The motion planners 110 can, for example, identify (e.g., select, generate) one or more staging poses for a robot to advantageously position or configure a robot whose trajectory or path is blocked or will be blocked by one or more other robots and/or where a suitable and unblocked trajectory or path cannot not be found. Such can, for example, be performed during a runtime of the robot(s). The staging pose can be identified using various heuristics to efficiently position or configure the robot to complete its task once its trajectory or path becomes unblocked or cleared and/or to prevent blocking a trajectory or path of another robot. The system can monitor the other robots and cause the robot to move toward a goal in response to a suitable path becoming unblocked or cleared or otherwise found, even before the given robot achieves the staging pose.

Optionally, the motion planners 110 may take into account an operational condition of the robots 102, for instance an occurrence or detection of a blocked trajectory or path or predicted blocked trajectory or path and/or an occurrence or detection of a situation in which a suitable and unblocked trajectory or path cannot not be found.

FIG. 2 shows an environment in which a first robot control system 200 includes a first motion planner 204*a*, that generates first motion plans 206*a* to control operation of a first robot 202, and which optionally provides the first motion plans 206*a* and/or representations of motions as obstacles to other motion planners 204*b* of other robot control systems 200*b* via at least one communications channel (indicated by proximate arrows, e.g., transmitter, receiver, transceiver, radio, router, Ethernet) to control other robots (not illustrated in FIG. 2), according to one illustrated implementation.

Likewise, the other motion planners 204*b* of the other robot control systems 200*b* generate other motion plans 206*b* to control operation of other robots (not illustrated in FIG. 2), and optionally provide the other motion plans 206*b* to the first motion planner 204*a* and other ones of the other motion planners 204*b* of other robot control systems 200*b*. The motion planners 204*a*, 204*b* may also optionally receive motion completed messages 209, which indicate when motions of various robots 202 have been completed. This may allow the motion planners 204*a*, 204*b* to generate new or updated motion plans based on a current or updated status of the environment. For example, a portion of a shared workspace may become unblocked or otherwise made available for a second robot to perform a task in, after a first robot 202 has completed a motion that is part or all of a set of motions to be formed as part of completing a task by the first robot. Additionally or alternatively, the motion planner 204*a* can receive information (e.g., images, occupancy grids, joint positions and joint angles/rotations) collected by various sensors or generated by the other motion planners 204*b*, which are indicative of when a portion of a shared workspace may become unblocked or otherwise made available for a second robot to perform a task in, after a first robot 202 has completed a motion that is part or all of a set of motions to be formed as part of completing a task by the first robot.

The robot control system(s) 200 may be communicatively coupled, for example via at least one communications channel (indicated by proximate arrows, e.g., transmitter, receiver, transceiver, radio, router, Ethernet), to receive motion planning graphs 208 and/or representations of swept volumes 211 from one or more sources 212 of motion planning graphs 208 and/or representations of swept volumes 211. The source(s) 212 of motion planning graphs 208 and/or swept volumes 211 may be separate and distinct from the motion planners 204*a*, 204*b*, according to one illustrated implementation. The source(s) 212 of motion planning graphs 208 and/or swept volumes 211 may, for example, be one or more processor-based computing systems (e.g., server computers), which may be operated or controlled by respective manufacturers of the robots 202 or by some other entity. The motion planning graphs 208 may each include a set of nodes 214 (only two called out in FIG. 2) which represent states, configurations or poses of the respective robot, and a set of edges 216 (only two called out in FIG. 2) which couple nodes 214 of respective pairs of nodes 214, and which represent legal or valid transitions between the states, configurations or poses. States, configurations or poses may, for example, represent sets of joint positions, orientations, poses, or coordinates for each of the joints of the respective robot 202. Thus, each node 214 may represent a pose of a robot 202 or portion thereof as completely defined by the poses of the joints comprising the robot 202. The motion planning graphs 208 may be determined, set up, or defined prior to a runtime (i.e., defined prior to performance of tasks), for example during a pre-runtime or configuration time. The swept volumes 211 represent respective volumes that a robot 202 or portion thereof would occupy when executing a motion or transition that corresponds to a respective edge 216 of the motion planning graph 208. The swept volumes 211 may be represented in any of a variety of forms, for example as voxels, a Euclidean distance field, a hierarchy of geometric objects. This advantageously permits some of the most computationally intensive work to be performed before runtime, when responsiveness is not a particular concern.

Each robot 202 may optionally include a base (not shown in FIG. 2). The base may be fixed in the environment or moveable therein (e.g., autonomous or semi-autonomous vehicle) Each robot 202 may optionally include a set of links, joints, end-of-arm tools or end effectors, and/or actuators 218*a*, 218*b*, 218*c* (three, shown, collectively 218) operable to move the links about the joints. The set of links, joints, end-of-arm tools or end effectors typically comprise one or more appendages of the robot, which robotic appendages can be moveably coupled to the base of the robot. Each robot 202 may optionally include one or more motion controllers (e.g., motor controllers) 220 (only one shown) that receive control signals, for instance in the form of motion plans 206*a*, and that provides drive signals to drive the actuators 218. Alternatively, the motion controllers 220 can be separate from, and communicatively coupled to, the robots 202.

There may be a respective robot control system 200 for each robot 202, or alternatively one robot control system 200 may perform the motion planning for two or more robots 202. One robot control system 200 will be described in detail for illustrative purposes. Those of skill in the art will recognize that the description can be applied to similar or even identical additional instances of other robot control systems 200.

The robot control system 200 may comprise one or more processor(s) 222, and one or more associated nontransitory computer- or processor-readable storage media for example system memory 224*a*, drives 224*b*, and/or memory or registers (not shown) of the processors 222. The nontransitory computer- or processor-readable storage media (e.g., system memory 224*a*, drive(s) 224*b*) are communicatively coupled to the processor(s) 222*a* via one or more communications channels, such as system bus 234. The system bus 234 can employ any known bus structures or architectures, including a memory bus with memory controller, a peripheral bus, and/or a local bus. One or more of such components may also, or instead, be in communication with each other via one or more other communications channels, for example, one or more parallel cables, serial cables, or wireless network channels capable of high speed communications, for instance, Universal Serial Bus ("USB") 3.0, Peripheral Component Interconnect Express (PCIe) or via Thunderbolt®.

The robot control system 200 may also be communicably coupled to one or more remote computer systems, e.g., server computer (e.g. source 212 of motion planning graphs 208), desktop computer, laptop computer, ultraportable computer, tablet computer, smartphone, wearable computer and/or sensors (not illustrated in FIG. 2), that are directly communicably coupled or indirectly communicably coupled to the various components of the robot control system 200, for example via a network interface 227. Remote computing systems (e.g., server computer (e.g., source 212 of motion planning graphs)) may be used to program, configure, control or otherwise interface with or input data (e.g., motion planning graphs 208, swept volumes 211, task specifications 215) to the robot control system 200 and various components within the robot control system 200. Such a connection may be through one or more communications channels, for example, one or more wide area networks (WANs), for instance, Ethernet, or the Internet, using Internet protocols. As noted above, pre-runtime calculations may be performed by a system that is separate from the robot control system 200 or robot 202, while runtime calculations may be performed by the processor(s) 222 of the robot control system 200, which in some implementations may be on-board the robot 202.

As noted, the robot control system 200 may include one or more processor(s) 222, (i.e., circuitry), nontransitory storage media (e.g., system memory 224*a*, drive(s) 224*b*), and system bus 234 that couples various system components. The processors 222 may be any logic processing unit, such as one or more central processing units (CPUs), digital signal processors (DSPs), graphics processing units (GPUs), field programmable gate arrays (FPGAs), application-specific integrated circuits (ASICs), programmable logic controllers (PLCs), etc. The system memory 224*a* may include read-only memory ("ROM") 226, random access memory ("RAM") 228, FLASH memory 230, EEPROM (not shown). A basic input/output system ("BIOS") 232, which can form part of the ROM 226, contains basic routines that help transfer information between elements within the robot control system 200, such as during start-up.

The drive(s) 224*b* may be, for example, a hard disk drive for reading from and writing to a magnetic disk, a solid state (e.g., flash memory) drive for reading from and writing to solid state memory, and/or an optical disk drive for reading from and writing to removable optical disks. The robot control system 200 may also include any combination of such drives in various different implementations. The drive(s) 224*b* may communicate with the processor(s) 222 via the system bus 234. The drive(s) 224*b* may include interfaces or controllers (not shown) coupled between such drives and the system bus 234, as is known by those skilled in the relevant art. The drive(s) 224*b* and its associated computer-readable media provide nonvolatile storage of computer- or processor readable and/or executable instructions, data structures, program modules and other data for the robot control system 200. Those skilled in the relevant art will appreciate that other types of computer-readable media that can store data accessible by a computer may be employed, such as WORM drives, RAID drives, magnetic cassettes, digital video disks ("DVD"), Bernoulli cartridges, RAMs, ROMs, smart cards, etc.

Executable instructions and data can be stored in the system memory 224*a*, for example an operating system 236, one or more application programs 238, other programs or modules 240 and program data 242. Application programs 238 may include processor-executable instructions that cause the processor(s) 222 to perform one or more of: generating discretized representations of the environment in which the robot 202 will operate, including obstacles and/or target objects or work pieces in the environment where planned motions of other robots may be represented as obstacles; generating motion plans or road maps including calling for or otherwise obtaining results of a collision assessment, setting cost values for edges in a motion planning graph, and evaluating available paths in the motion planning graph; identifying (e.g., selecting, generating) staging poses, optionally storing the determined plurality of motion plans or road maps, and/or providing instructions to cause one or more robots to move per the motion plans. The motion planning and motion plan construction (e.g., collision detection or assessment, updating costs of edges in motion planning graphs based on collision detection or assessment, identification of staging poses (e.g., via one or more heuristics), and path search or evaluation including assessment of viable paths for suitable paths, and optionally selection of a selected path from the viable or suitable paths) can be executed as described herein (e.g., with reference to FIGS. 4, 5, 6 and 7) and in the references incorporated herein by reference. The collision detection or assessment may perform collision detection or assessment using various structures and techniques described elsewhere herein. Application programs 238 may also include one or more machine-readable and machine-executable instructions that cause the processor(s) 222 to monitor the robots in the environment to determine when a trajectory or path (e.g., viable path) becomes unblocked or cleared, and to cause the robot to move toward a goal in response to the trajectory or path becoming unblocked or cleared. Application programs 238 may additionally include one or more machine-readable and machine-executable instructions that cause the processor(s) 222 to perform other operations, for instance optionally handling perception data (captured via sensors). Application programs 238 may additionally include one or more machine-executable instructions that cause the processor(s) 222 to perform various other methods described herein and in the references incorporated herein by reference.

In various implementations, one or more of the operations described above may be performed by one or more remote processing devices or computers, which are linked through a communications network (e.g., network 210) via network interface 227.

While shown in FIG. 2 as being stored in the system memory 224*a*, the operating system 236, application programs 238, other programs/modules 240, and program data 242 can be stored on other nontransitory computer- or processor-readable media, for example drive(s) 224*b*.

The motion planner 204 of the robot control system 200 may include dedicated motion planner hardware or may be implemented, in all or in part, via the processor(s) 222 and processor-executable instructions stored in the system memory 224*a* and/or drive(s) 224*b*.

The motion planner 204 may include or implement a motion converter 250, a collision detector 252, staging pose identifier 253, staging pose setter 255, a cost setter 254 and a path analyzer 256.

The motion converter 250 converts motions of other ones of the robots into representations of obstacles. The motion converter 250 receives the motion plans 206*b* or other representations of motion from other motion planners 204*b*.

The motion converter 250 can include a trajectory predictor 251 to predict trajectories of transient objects (e.g., other robots, other objects including, for instance people), for example where the trajectory of the transient objects is not known (e.g., where the object is another robot but no motion plan for that other robot has been received, where the object is not another robot, for instance a human). The trajectory predictor 251 can, for example, assume that an object will continue an existing motion in both direction, speed and acceleration, with no changes. The trajectory predictor 251 can, for example, account for expected changes in a motion or path of an object, for example where the path of the object will result in a collision, thus the object can be expected to stop or change direction, or where a goal of the object is known, thus the object can be expected to stop upon reaching the goal. The trajectory predictor 251 can, in at least some instances, employ learned behavioral models of the object to predict the trajectory of the object.

The motion converter 250 then determines an area or volume corresponding to the motion(s). For example, the motion converter can convert the motion to a corresponding swept volume, that is a volume swept by the corresponding robot or portion thereof in moving or transitioning between poses as represented by the motion plan. Advantageously, the motion converter 250 may simply queue the obstacles (e.g., swept volumes), and may not need to determine, track or indicate a time for the corresponding motion or swept volume. While described as a motion converter 250 for a given robot 202 converting the motions of other robots to obstacles, in some implementations the other robots may provide the obstacle representation (e.g., swept volume) of a particular motion to the given robot 202.

The collision detector 252 performs collision detection or analysis, determining whether a transition or motion of a given robot 202 or portion thereof will result in a collision with an obstacle. As noted, the motions of other robots may advantageously be represented as obstacles. Thus, the collision detector 252 can determine whether a motion of one robot will result in collision with another robot that moves through the shared workspace.

In some implementations, collision detector 252 implements software based collision detection or assessment, for example performing a bounding box-bounding box collision assessment or assessing based on a hierarchy of geometric (e.g., spheres) representation of the volume swept by the robots 202, 202*b* or portions thereof during movement. In some implementations, the collision detector 252 implements hardware based collision detection or assessment, for example employing a set of dedicated hardware logic circuits to represent obstacles and streaming representations of motions through the dedicated hardware logic circuits. In hardware based collision detection or assessment, the collision detector can employ one or more configurable arrays of circuits, for example one or more FPGAs 258, and may optionally produce Boolean collision assessments.

In response to a determination that another robot (e.g., a second robot) is blocking or will block a viable trajectory or viable path toward the first goal for a robot (e.g., a first robot), the staging pose identifier 253 can identify a staging pose for the first robot. The staging pose identifier 253 can, for example, select a pose corresponding to a node in the motion planning graph for the staging pose. The staging pose can be a pose corresponding to a node that is already included in the viable path that is between a current pose of the first robot and the first goal pose for the first robot. Alternatively, the staging pose can be a pose corresponding to a node that is not already included in the viable path between a current pose of the first robot and the first goal pose for the first robot. Thus, the staging pose can be a new node added to the viable path to, for example, create a "revised" viable path between a current pose of the first robot and the first goal for the first robot. It is noted that a new node may have one or more intermediate nodes between itself and a nearest (least number of edges) node in the existing viable path. Thus, generating a revised viable path can include adding, one, two or even more nodes to an existing viable path.

The staging pose identifier 253 can employ one or more heuristics to identify the staging pose. The staging pose identifier 253 can, for example, determine a first staging pose based at least in part on an expected movement of at least the second robot. The staging pose identifier 253 can, for example, determine the first staging pose to locate the first robot in a position that minimizes a probability of collision with the second robot as the second robot moves according to the expected movement. The staging pose identifier 253 can, for example, autonomously determine the first staging pose for the first robot by, for instance, determining the first staging pose based at least in part on an assessment of a respective distance from the first goal for each of a plurality of poses.

In response to a determination that another robot (e.g., a second robot) is blocking or will block a viable trajectory or viable path toward the first goal for a robot (e.g., a first robot), the staging pose setter 255 can set the staging pose, for example using the staging pose identified by the staging pose identifier 253. For example, the staging pose setter 255 can revise a viable path in a motion planning graph to include the staging pose, and any intermediate nodes, in the viable path, for example resulting in a revised viable path.

The cost setter 254 can set or adjust a cost of edges in a motion planning graph, based at least in part on the collision detection or assessment. For example, the cost setter 254 can set a relatively high cost value for edges that represent transitions between states or motions between poses that result or would likely result in collision. Also for example, the cost setter 254 can set a relatively low cost value for edges that represent transitions between states or motions between poses that do not result or would likely not result in collision. Setting cost can include setting a cost value that is logically associated with a corresponding edge via some data structure (e.g., field, pointer, table).

The path analyzer 256 may determine a path (e.g., optimal or optimized) using the motion planning graph with the cost values. For example, the path analyzer 256 may constitute a least cost path optimizer that determines a lowest or relatively low cost path between two states, configurations or poses, the states, configurations or poses which are represented by respective nodes in the motion planning graph. The path analyzer 256 may use or execute any variety of path finding algorithms, for example lowest cost path finding algorithms, taking into account cost values associated with each edge which represent likelihood of collision and optionally represent one or more of: a severity of collision, an expenditure or consumption of energy and/or of time or latency to execute or complete.

Various algorithms and structures to determine the least cost path may be used, including those that implement the Bellman-Ford algorithm, but others may be used, including, but not limited to, any such process in which the least cost path is determined as the path between two nodes in the motion planning graph 208 such that the sum of the costs or weights of its constituent edges is minimized. This process improves the technology of motion planning for a robot 102, 202 by using a motion planning graph which represents motions of other robots as obstacles and collision detection to increase the efficiency and response time to find the "best" path to perform a task without collisions.

The motion planner 204*a* may optionally include a pruner 260. The pruner 260 may receive information that represents completion of motions by other robots, the information denominated herein as motion completed messages 209. Alternatively, a flag could be set to indicate completion. In response, the pruner 260 may remove an obstacle or portion of an obstacle that represents the now completed motion. That may allow generation of a new motion plan for a given robot, which may be more efficient or allow the given robot to attend to performing a task that was otherwise previously prevented by the motion of another robot. This approach advantageously allows the motion converter 250 to ignore timing of motions when generating obstacle representations for motions, while still realizing better throughput than using other techniques. The motion planner 204*a* may additionally send a signal, prompt or trigger to cause the collision detector 252 to perform a new collision detection or assessment given the modification of the obstacles to produce an updated motion planning graph in which the edge weights or costs associated with edges have been modified, and to cause the cost setter 254 and path analyzer 256 to update cost values and determine a new or revised motion plan accordingly.

The motion planner 204*a* may optionally include an environment converter 263 that converts output (e.g., digitized representations of the environment) from optional sensors 262 (e.g., digital cameras) into representations of obstacles. Thus, the motion planner 204*a* can perform motion planning that takes into account transitory objects in the environment, for instance people, animals, etc.

The processor(s) 222 and/or the motion planner 204*a* may be, or may include, any logic processing units, such as one or more central processing units (CPUs), digital signal processors (DSPs), graphics processing units (GPUs), application-specific integrated circuits (ASICs), field programmable gate arrays (FPGAs), programmable logic controllers (PLCs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A. The construction and operation of the various structure shown in FIG. 2 may implement or employ structures, techniques and algorithms described in or similar to those described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS"; International Patent Application Publication No. WO 2016/122840, filed Jan. 5, 2016, entitled "SPECIALIZED ROBOT MOTION PLANNING HARDWARE AND METHODS OF MAKING AND USING SAME"; and/or U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS".

Although not required, many of the implementations will be described in the general context of computer-executable instructions, such as program application modules, objects, or macros stored on computer- or processor-readable media and executed by one or more computer or processors that can perform obstacle representation, collision assessments, and other motion planning operations.

Motion planning operations may include, but are not limited to, generating or transforming one, more or all of: a representation of the robot geometry based on a geometric model 112 (FIG. 1), tasks 114 (FIG. 1), and the representation of volumes (e.g. swept volumes) occupied by robots in various states or poses and/or during movement between states or poses into digital forms, e.g., point clouds, Euclidean distance fields, data structure formats (e.g., hierarchical formats, non-hierarchical formats), and/or curves (e.g., polynomial or spline representations). Motion planning operations may optionally include, but are not limited to, generating or transforming one, more or all of: a representation of the static or persistent obstacles (e.g., static object data 118, FIG. 1) and/or the perception data representative of static or transient obstacles (e.g., perception data 120, FIG. 1) into digital forms, e.g., point clouds, Euclidean distance fields, data structure formats (e.g., hierarchical formats, non-hierarchical formats), and/or curves (e.g., polynomial or spline representations).

Motion planning operations may include, but are not limited to, determining or detecting or predicting collisions for various states or poses of the robot or motions of the robot between states or poses using various collision assessment techniques or algorithms (e.g., software based, hardware based).

In some implementations, motion planning operations may include, but are not limited to, determining one or more motion planning graphs, motion plans or road maps; storing the determined planning graph(s), motion plan(s) or road map(s), and/or providing the planning graph(s), motion plan(s) or road map(s) to control operation of a robot.

In one implementation, collision detection or assessment is performed in response to a function call or similar process, and returns a Boolean value thereto. The collision detector 252 may be implemented via one or more field programmable gate arrays (FPGAs) and/or one or more application specific integrated circuits (ASICs) to perform the collision detection while achieving low latency, relatively low power consumption, and increasing an amount of information that can be handled.

In various implementations, such operations may be performed entirely in hardware circuitry or as software stored in a memory storage, such as system memory 224*a*, and executed by one or more hardware processors 222*a*, such as one or more microprocessors, digital signal processors (DSPs), field programmable gate arrays (FPGAs), application specific integrated circuits (ASICs), graphics processing units (GPUs) processors, programmed logic controllers (PLCs), electrically programmable read only memories (EEPROMs), or as a combination of hardware circuitry and software stored in the memory storage.

Various aspects of perception, planning graph construction, collision detection, and path search that may be employed in whole or in part are also described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," International Patent Application Publication No. WO 2016/122840, filed Jan. 5, 2016, entitled "SPECIALIZED ROBOT MOTION PLANNING HARDWARE AND METHODS OF MAKING AND USING SAME"; U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS"; U.S. Patent Application No. 62/856,548, filed Jun. 3, 2019, entitled "APPARATUS, METHODS AND ARTICLES TO FACILITATE MOTION PLANNING IN ENVIRONMENTS HAVING DYNAMIC OBSTACLES", and International Patent Application No. PCT/US2020/039193, filed Jun. 23, 2020, entitled "MOTION PLANNING FOR MULTIPLE ROBOTS IN SHARED WORKSPACE" and published as WO 2020/263861. Those skilled in the relevant art will appreciate that the illustrated implementations, as well as other implementations, can be practiced with other system structures and arrangements and/or other computing system structures and arrangements, including those of robots, hand-held devices, multiprocessor systems, microprocessor-based or programmable consumer electronics, personal computers ("PCs"), networked PCs, mini computers, mainframe computers, and the like. The implementations or embodiments or portions thereof (e.g., at configuration time and runtime) can be practiced in distributed computing environments where tasks or modules are performed by remote processing devices, which are linked through a communications network. In a distributed computing environment, program modules may be located in both local and remote memory storage devices or media. However, where and how certain types of information are stored is important to help improve motion planning.

For example, various motion planning solutions "bake in" a roadmap (i.e., a motion planning graph) into the processor (e.g., FPGA), and each edge in the roadmap corresponds to a non-reconfigurable Boolean circuit of the processor. The design in which the planning graph is "baked in" to the processor, poses a problem of having limited processor circuitry to store multiple or large planning graphs and is generally not reconfigurable for use with different robots.

One solution provides a reconfigurable design that places the planning graph information into memory storage. This approach stores information in memory instead of being baked into a circuit. Another approach employs templated reconfigurable circuits in lieu of memory.

As noted above, some of the information (e.g., robot geometric models) may be captured, received, input or provided during a configuration time, that is before run time. The received information may be processed during the configuration time to produce processed information (e.g., motion planning graphs) to speed up operation or reduce computation complexity during runtime.

During the runtime, collision detection may be performed for the entire environment, including determining, for any pose or movement between poses, whether any portion of the robot will collide or is predicted to collide with another portion of the robot itself, with other robots or portions thereof, with persistent or static obstacles in the environment, or with transient obstacles in the environment with unknown trajectories (e.g., people).

Figure 3A:
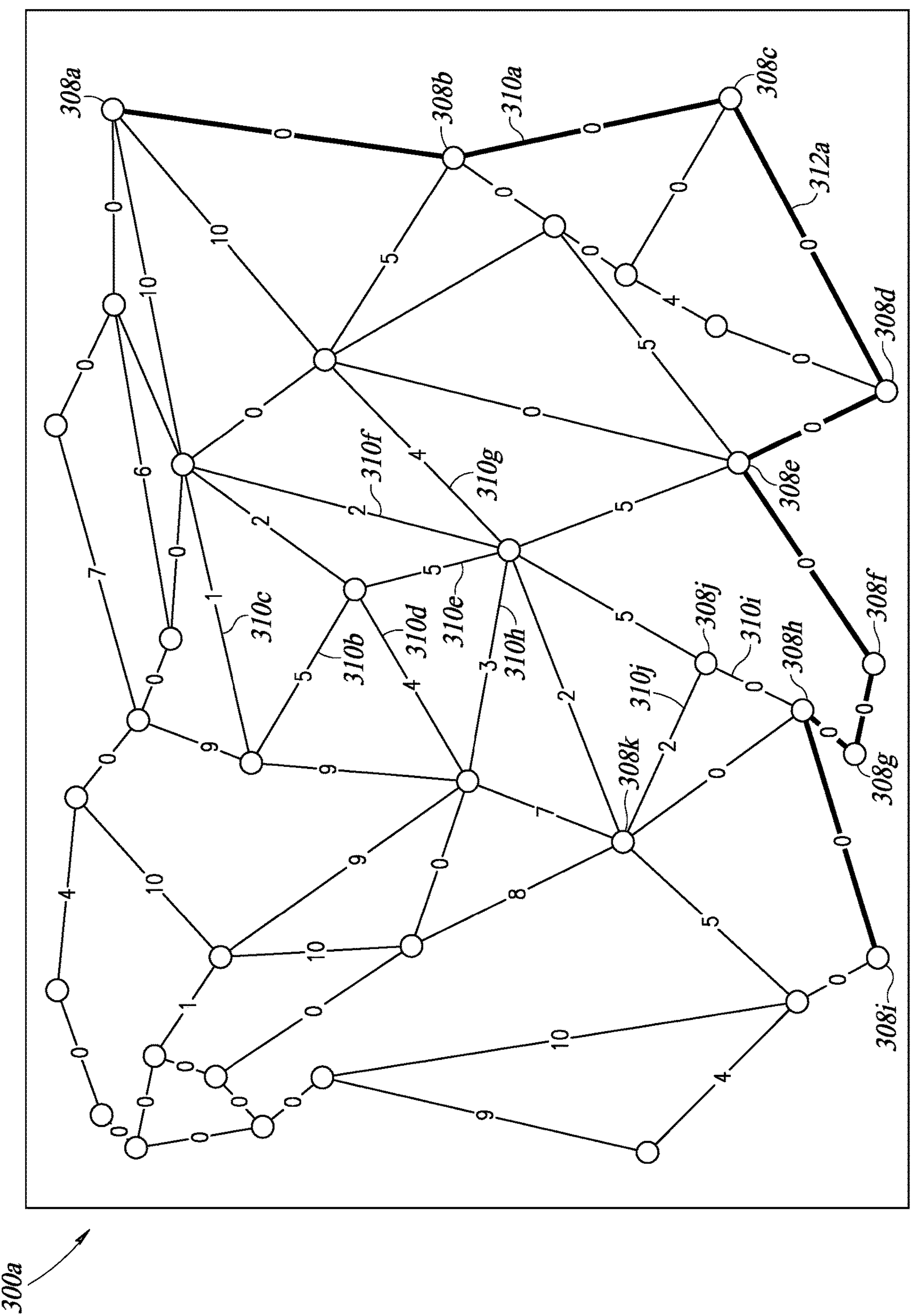
FIG. 3A is an example motion planning graph of a C-space for a robot that operates in a shared workspace with a path between a current node representing a current pose and a goal node representing a goal pose, according to one illustrated implementation.
Figure 3B:
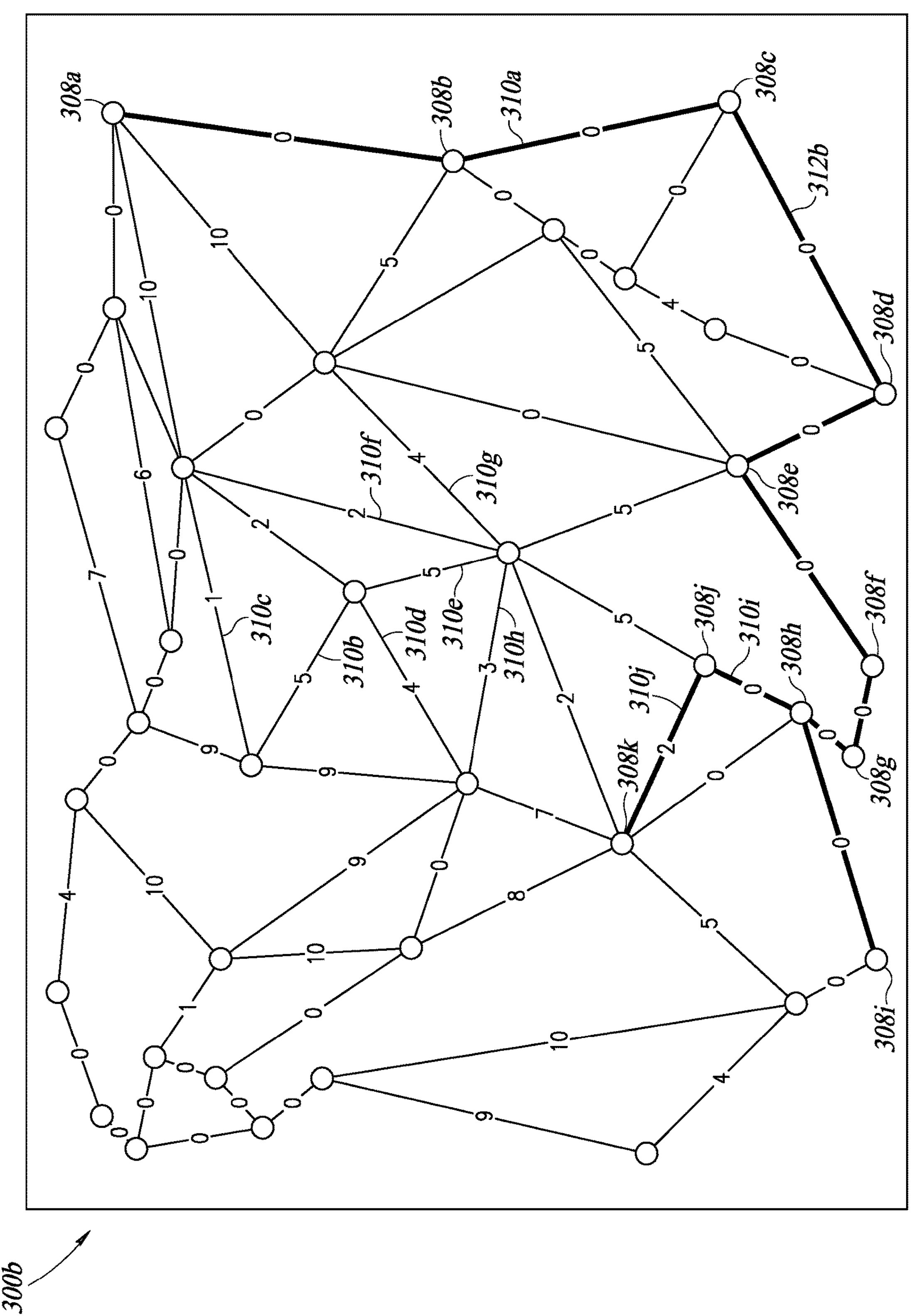
FIG. 3B is an example motion planning graph of a C-space for a robot that operates in a shared workspace with a path between a current node representing a current pose and a goal node representing a goal pose with a staging node representing a staging pose, according to one illustrated implementation.

FIGS. 3A and 3B show example motion planning graphs 300*a*, 300*b* for the robot 102 (FIG. 1), 202 (FIG. 2) in the case where the goal of the robot 102, 202 is to perform a task while avoiding collisions with static obstacles and dynamic obstacles, the obstacles which can include other robots operating in a shared workspace. In particular, the motion planning graph 300*a* illustrates a first viable path 312*a* between a current node and a goal node. In this example, the first viable path 312*a* is comprised of the edges between nodes 308*a*, 308*b*, 308*c*, 308*d*, 308*e*, 308*f*, 308*g*, 308*h*, and 308*i* sequentially, and is illustrated in FIG. 3A with heavier line weight than the other edges in the motion planning graph 300*a*. The motion planning graph 300*b* illustrates a "revised" viable path 312*b* between the current node and the goal node with a staging pose added to the first viable path 312*a* to obtain the "revised" viable path 312*b*. The "revised" viable path 312*b* is comprised of the edges between nodes 308*a*, 308*b*, 308*c*, 308*d*, 308*e*, 308*f*, 308*g*, 308*h*, 308*j*, 308*k*, 308*j*, 308*h* and 308*i* sequentially, and is illustrated in FIG. 3B with heavier line weight than the other edges in the motion planning graph 300*b*. As used herein, the term viable path refers to a path that is complete from a start or current node to a goal node. The viable paths of a set of viable paths can be assessed to identify one or more suitable or even optimal viable path based at least in part on an associated cost or cost function of each viable path, and optionally on a threshold or acceptable cost. As explained herein, a cost or cost function can represent an assessment of the risk of collision, a severity of collision, an expenditure or consumption of energy and/or of time or latency associated with the viable path.

The motion planning graphs 300*a*, 300*b* each respectively comprise a plurality of nodes, represented in the drawing as open circles, connected by edges, represented in the drawing as straight lines between pairs of nodes. A subset of the nodes are called out as nodes 308*a*-308*k*, and a subset of the edges are called out as edges 310*a*-310*i*. Each node represents, implicitly or explicitly, time and variables that characterize a state of the robot 102, 202 in the configuration space of the robot 102, 202. The configuration space is often called C-space and is the space of the states or configurations or poses of the robot 102, 202 represented in the motion planning graph 300*a*, 300*b*. For example, each node may represent the state, configuration or pose of the robot 102, 202 which may include, but is not limited to, a position, orientation or pose (i.e., position and orientation). The state, configuration or pose may, for example, be represented by a set of joint positions and joint angles/rotations (e.g., joint poses, joint coordinates) for the joints of the robot 102, 202.

The edges in the motion planning graph 300*a*, 300*b* represent valid or allowed transitions between these states, configurations or poses of the robot 102, 202. The edges in the motion planning graph 300*a*, 300*b* do not represent actual movements in Cartesian coordinates (2-space or 3-space), but rather represent transitions between states, configurations or poses in C-space of the robot. Each edge of the motion planning graph 300*a*, 300*b* represents a transition of a robot 102, 202 between a respective pair of nodes. For example, edge 310*a* represents a transition of a robot 102, 202, between two nodes. In particular, edge 310*a* represents a transition between a state of the robot 102, 202 in a particular configuration associated with node 308*b* and a state of the robot 102, 202 in a particular configuration associated with node 308*c*. For example, robot 102, 202 may currently be in a particular configuration associated with node 308*a*. Although the nodes are shown at various distances from each other, this is for illustrative purposes only and this is no relation to any physical distance. There is no limitation on the number of nodes or edges in the motion planning graph 300*a*, 300*b*, however, the more nodes and edges that are used in the motion planning graph 300*a*, 300*b*, the more accurately and precisely the motion planner may be able to determine a suitable or even an optimal path according to one or more states, configurations or poses of the robot 102, 202 to carry out a task since there are more viable paths to select the least cost path from.

Each edge is assigned or associated with a cost value. The cost value may represent a collision assessment with respect to a motion that is represented by the corresponding edge.

The cost value may additionally represent other information, for example an energy expenditure associated with the transition or a duration of time to complete an associated movement or transition or task.

Typically, it is desirable for robot 102, 202 to avoid certain obstacles, for example other robots in a shared workspace. In some situations, it may be desirable for robot 102, 202 to contact or come in close proximity to certain objects in the shared workspace, for example to grip or move an object or work piece. FIGS. 3A and 3B show a motion planning graph 300*a* and a "revised" motion planning graph 300*b*, respectively, used by a motion planner to identify a viable path (indicated by bolded lines first viable path 312*a*, revised viable path 312*b*) for robot 102, 202. The first viable path 312*a* and revised viable path 312*b* are generated or selected to cause the robot 102, 202 to move to a goal by moving through a number of "intermediate poses" while avoiding collisions with one or more obstacles. The goal is typically a location at which the robot 102, 202 carries out a specified task (e.g., picking and placing an object) and a goal pose is a pose of the robot for performing the specified task.

Obstacles may be represented digitally, for example, as bounding boxes, oriented bounding boxes, curves (e.g., splines), Euclidean distance field, or hierarchy of geometric entities, whichever digital representation is most appropriate for the type of obstacle and type of collision detection that will be performed, which itself may depend on the specific hardware circuitry employed. In some implementations, the swept volumes in the roadmap for the robot(s) 102 are precomputed. Examples of collision assessment are described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS"; U.S. Patent Application 62/722,067, filed Aug. 23, 2018 entitled "COLLISION DETECTION USEFUL IN MOTION PLANNING FOR ROBOTICS"; and in International Patent Application Publication No. WO 2016/122840, filed Jan. 5, 2016, entitled "SPECIALIZED ROBOT MOTION PLANNING HARDWARE AND METHODS OF MAKING AND USING SAME."

The motion planner 110*a*, 110*b*, 110*c* (FIG. 1), 204 (FIG. 2) or a portion thereof (e.g., collision detector 252, FIG. 2) determines or assesses a likelihood or probability that a pose (represented by a node) and/or motion or transition (represented by an edge) will result in a collision with an obstacle. In some instances, the determination results in a Boolean value, while in others the determination may be expressed as a probability.

For nodes in the motion planning graph 300*a*, 300*b* where there is a probability that direct transition between the nodes will cause a collision with an obstacle, the motion planner (e.g., cost setter 254, FIG. 2) assigns a cost value or weight to the edges of the planning graph 300 transitioning between those nodes (e.g., edges 310*a*, 310*b*, 310*c*, 310*d*, 310*e*, 310*f*, 310*g*, 310*h*) indicating the probability of a collision with the obstacle.

For example, the motion planner may, for each of a number of edges of the motion planning graph 300*a*, 300B that has a respective probability of a collision with an obstacle below a defined threshold probability of a collision, assign a cost value or weight with a value equal or close to zero. In the present example, the motion planner has assigned a cost value or weight of zero to those edges in the planning graph 300*a*, 300*b* which represent transitions or motions of the robot 102, 202 that do not have any or have very little probability of a collision with an obstacle. For each of a number of edges of the motion planning graph 300*a*, 300*b* with a respective probability of a collision with an obstacle in the environment above the defined threshold probability of a collision, the motion planner assigns a cost value or weight with a value substantially greater than zero. In the present example, the motion planner has assigned a cost value or weight of greater than zero to those edges in the motion planning graph 300*a*, 300*b* which have a relatively high probability of collision with an obstacle. The particular threshold used for the probability of collision may vary. For example, the threshold may be 40%, 50%, 60% or lower or higher probability of collision. Also, assigning a cost value or weight with a value greater than zero may include assigning a weight with a magnitude greater than zero that corresponds with the respective probability of a collision. For example, as shown in the motion planning graph 300*a*, 300*b*, the motion planner has assigned a relatively high cost value or weight of 10 to some edges that have a higher probability of collision, but has assigned a cost value or weight with a relatively lower magnitude of 0 to other edges, which the motion planner determined have a much lower probability of collision. In other implementations, the cost values or weights may present a binary choice between collision and no collision, there being only two cost values or weights to select from in assigning cost values or weights to the edges.

The motion planner (e.g., cost setter 254, FIG. 2) may assign, set or adjust cost values or weights of each edge based on factors or parameters (e.g., energy expenditure, overall duration of time to complete an associated movement, transition and/or task) in addition to being based on an associated probability of collision.

After the motion planner sets a cost value or weight representing a probability of collision of the robot 102, 202 with an obstacle based at least in part on the collision assessment, the motion planner (e.g., path analyzer 256, FIG. 2) identifies or generates viable paths (e.g., feasible paths with valid transitions between a start node and a goal node), and optionally performs an optimization to identify (e.g., determine, select) a suitable path (e.g., a viable path that satisfies one or more conditions or thresholds) or even select a selected viable path (e.g., an optimal viable path or a best viable path or best suitable viable path) for instance first viable path 312*a* or revised viable path 312*b* in the resulting motion planning graph 300*a*, 300*b* that provides a motion plan for the robot 102, 202 as specified by the identified suitable or even optimal viable path for instance first viable path 312*a* or revised viable path 312*b* with no or a relatively low potential of a collision with obstacles including other robots operating in a shared workspace.

In one implementation, once all edge costs of the motion planning graph 300*a*, 300*b* have been assigned or set, the motion planner (e.g., path analyzer 256, FIG. 2) may perform a calculation to determine a least cost path to or toward a goal represented by a goal node 308*i*. For example, the path analyzer 256 (FIG. 2) may perform a least cost path algorithm from the current state of the robot 102, 202 represented by current node 308*a* in the motion planning graph 300*a*, 300*b* to possible states, configurations or poses. The least cost (closest to zero) path in the motion planning graph 300*a*, 300*b* is then selected by the motion planner. As explained above, cost may reflect not only probability of collision, but also other factors or parameters (e.g., energy expenditure, overall duration of time to complete associated movement, transition and/or task). In the example illustrated in FIGS. 3A and 3B, a current state, configuration or pose of the robot 102, 202 in the motion planning graph 300*a*, 300*b* is at node 308*a*, and a goal state, configuration or pose of the robot 102, 202 that places at least a portion (e.g., end effector, end of arm tool) of the given robot at a goal to perform the given task is a node 308*i*. In FIG. 3A, a viable path between the current node 308*a* and the goal node 308*i* is depicted as first viable path 312*a* (bolded line path comprising segments extending from node 308*a* through node 308*i* successively) in the motion planning graph 300*a*. In FIG. 3B, a viable path (e.g., revised) between the current node 308*a* and the goal node 308*i* is depicted as revised viable path 312*b* (bolded line path comprising segments extending from node 308*a* through node 308*i*, with intermediary nodes 308*j* and 308*k*) in the motion planning graph 300*b*. It is noted that in this example, to move to the staging pose represented by node 308*k*, the given robot first transitions to an intermediary pose represented by node 308*j*, and then transitions to the staging pose represented by node 308*k*, assuming the path does not clear or become unblocked during those transitions. It is also noted that in this example, to move from the staging pose presented by node 308*k* to the goal pose represented by goal node 308*i*, the given robot first transitions from the staging pose represented by node 308*k* to the intermediary pose represented by node 308*j*, and then transitions to the goal pose represented by goal node 308*i* via a pose represented by node 308*h*. As noted above, a staging pose (represented by node 308*k*) and an intermediate pose (represented by node 308*j*) have been added to the first viable path 312*a* to obtain the revised viable path 312*b*. In other implementations or instances intermediary poses can be omitted or more than one intermediary pose can be employed. The staging pose can allow the robot 102, 202 to avoid collision and improve operational efficiency, for example staging the robot 102, 202 until the trajectory or viable path become clear or unobstructed by other robots operating in the workspace.

Although shown as a first viable path 312*a* and revised viable path 312*b* in motion planning graph 300*a*, 300*b*, respectively, with many sharp turns, such turns do not represent corresponding physical turns in a route, but logical transitions between states, configurations or poses of the robot 102, 202. For example, each edge in the identified first viable path 312*a* and/or revised viable path 312*b* may represent a state change with respect to physical configuration of the robot 102, 202 in the environment, but not necessarily a change in direction of the robot 102, 202 corresponding to the angles of the first viable path 312*a* and/or revised viable path 312*b* shown in FIGS. 3A and 3B.

Figure 4:
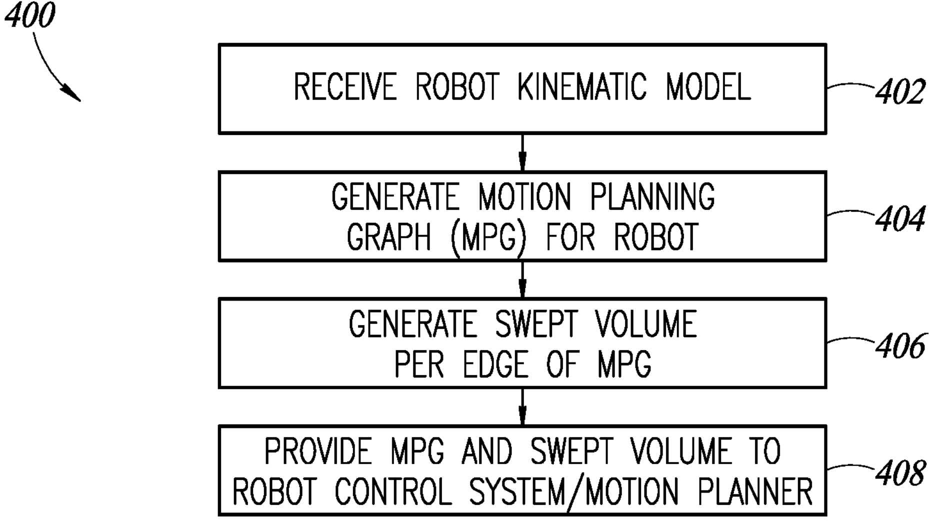
FIG. 4 is a flow diagram showing a method of operation in a processor-based system to produce motion planning graphs and swept volumes, according to at least one illustrated implementation.

FIG. 4 shows a method 400 of operation in a processor-based system to produce motion planning graphs and swept volumes, according to at least one illustrated implementation. The method 400 may be executed before a runtime, for example during a configuration time. The method 400 may be executed by a processor-based system (e.g., server computer) that is separate and distinct, and possibly remote, from one or more robots and/or one or more robot control systems.

Motion planning graphs take significant time and resources to build, but as described herein, one would only have to do that once, for example, during a configuration time that occurs prior to runtime. Once generated, the motion planning graphs may be stored, for instance stored in a planning graph edge information memory or other non-transitory computer- or processor-readable medium, and it is relatively quick and efficient for the processor to swap the motion planning graphs in and out, or select which motion planning graph to use, for instance based on a current characteristic of a robot (e.g., such as when the robot is grasping an object of a particular size).

As noted above, some pre-processing activities may be performed before runtime and thus, in some implementations, these operations may be performed by remote processing devices, which are linked through a communications network to a robot control system via network interface. For example, a pre-runtime programming or configuration phase allows preparation of the robot for a problem of interest. In such implementations, extensive preprocessing is leveraged to avoid runtime computation. Preprocessing can, for example, include generating precomputed data (i.e., computed before runtime of the robot) regarding a volume in 3D space swept by the robot when making a transition in a motion planning graph from one state to another state, the transitions represented by edges in the motion planning graph. The precomputed data can, for example, be stored in memory (e.g., planning graph edge information memory) and accessed by the appropriate processor during runtime. A system can also build a family of motion planning graphs prior to runtime corresponding to different possible changing dimensional characteristics of a robot that may occur during runtime. The system then stores such planning graphs in memory.

At 402, at least one component of the processor-based system receives a kinematic model that represents the robot for which motion planning will be performed. The kinematic model, for example, represents a robotic appendage with a number of links and a number of joints, the joints between respective pairs of the links. The kinematic model can be in any known or to be developed format. Optionally, at least one component of the processor-based system generates a data structure representation of the robot based, at least in part, on the kinematic model of the robot. The data structure representation includes a representation of a number of links and joints. Various suitable data structures and techniques can be employed, for example various hierarchical data structures (e.g., tree data structures) or non-hierarchical data structures (e.g., EDF data structures). Such can, for example, employ any of the structures, methods or techniques described in PCT/US2019/045270, published as WO 2020/040979.

At 404, the processor-based system generates a motion planning graph for a robot based on the respective robot kinematic model. The motion planning graph represents each state, configuration or pose of the robot as a respective node, and represents valid transitions between pairs of states, configurations or poses as edges which connect the corresponding pair of nodes. While described in terms of a graph, the motion planning graph does not necessarily need to be represented or stored as a conventional graph, but rather can be represented, for example logically or in a memory circuit or computer processor, using any variety of data structures (e.g., records and fields, tables, linked lists, pointers, trees).

At 406, the processor-based system optionally generates a swept volume for each edge of the motion planning graph for the robot for which motion planning is to be performed. The swept volume represents a volume swept by the robot or a portion thereof in executing a motion or transition that corresponds to the respective edge. The swept volume may be represented in any of a large variety of forms, for example as voxels, a Euclidean distance field, a hierarchy of spheres or other geometric objects.

At 408, the processor-based system provides the motion planning graphs and/or the swept volumes to a robot control system and/or motion planner. The processor-based system may provide the motion planning graphs and/or the swept volumes via a non-proprietary communications channel (e.g., Ethernet). In some implementations, various robots from different robot manufacturers may operate in a shared workspace. In some implementations, various robot manufacturers may operate proprietary processor-based systems (e.g., server computers) that generate the motion planning graphs and/or the swept volumes for the various robots that the robot manufacturers produce. Each of the robot manufacturers can provide the respective motion planning graphs and/or swept volumes for use by the robot controllers or motion planners.

The processor-based systems can, for example, use any one or more of the structures and methods described in: PCT/US2019/045270, published as WO 2020/040979; PCT/US2020/034551, published as WO 2020/247207; and/or PCT/US2019/016700, published as WO 2019/156984 to produce motion planning graphs for the robot(s) for which motion planning is to be performed and/or to produce swept volumes that represent the robot(s) for which motion planning is to be performed.

Figure 5:
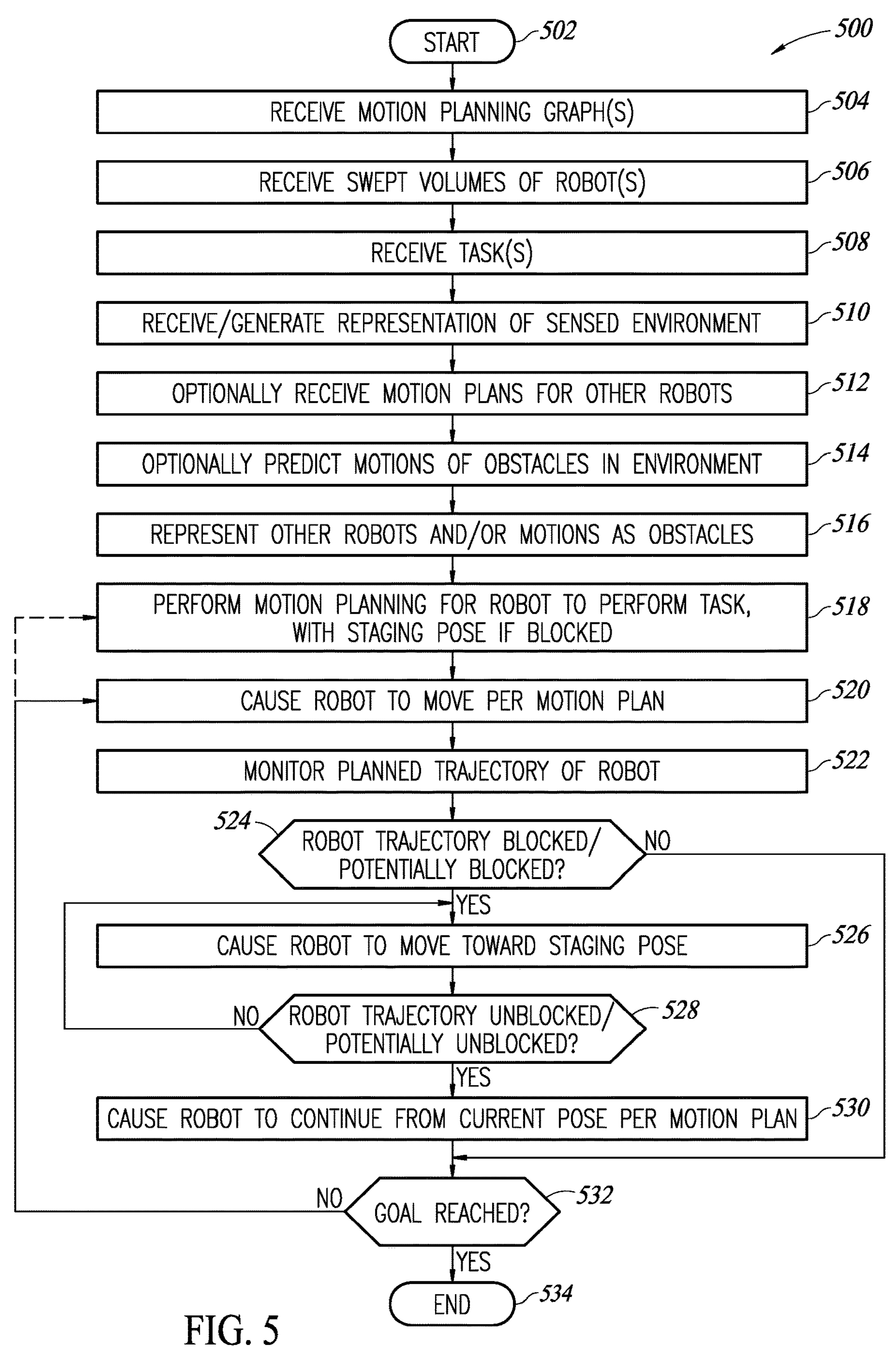
FIG. 5 is a flow diagram showing a method of operation of a processor-based system to control one or more robots, for example during a runtime of the robots, according to at least one illustrated implementation.

FIG. 5 shows a method 500 of operation of a processor-based system to control one or more robots, according to at least one illustrated implementation. The method 500 can be executed during a runtime of the robot(s). Alternatively, a portion of the method 500 can be executed during a configuration time, before the runtime of the robot(s), and a portion of the method 500 can be executed during the runtime of the robot(s).

The method 500 can be executed for one, two or more robots operating in a multiple robot operational environment or workspace. For example, the method 500 can be executed sequentially for each of two or more robots (e.g., a first robot $R_1$, a second robot $R_2$, a third robot $R_3$). For ease of discussion the method 500 is described with respect to control of a first robot $R_1$ where a second robot $R_2$ in the operational environment potentially represents an obstacle to movement of the first robot $R_1$. One of skill in the art will recognize from the discussion that this method can be extrapolated to control one robot where there are two or more other robots in the operational environment, or control of two or more robots where there are two or more robots in the operational environment. Such can, for instance, be performed by sequentially executing the method 500 for each robot, and/or for instance successively iteratively executing the method 500 for a given robot relative to each of the other robots that present potential obstacles to the movement of the given robot.

The method 500 can execute at a runtime, a period during which at least one of the robots is operating (e.g., moving, performing tasks) and typically two or more robots are operating, the runtime for example following a configuration time. The method 500 may be executed by one or more processor-based systems that take the form of one or more robot control systems, although the method 500 will be described with respect to one processor-based system. The robot control systems may, for example, be co-located or located "on-board" respective ones of the robots.

The method 500 starts at 502, for example in response to a powering ON of a robot and/or robot control system, in response to a call or invocation from a calling routine, or in response to receipt of a task to be performed by a robot.

At 504, the processor-based system optionally receives motion planning graph(s) for one or more robots. For example, the processor-based system may receive the motion planning graph(s) from another processor-based system, which generated the motion planning graph(s) during a configuration time, for instance as described with respect to and as illustrated in FIG. 4. The motion planning graphs represent each state, configuration or pose of the robot as a respective node, and represent valid transitions between pairs of states, configurations or poses as edges which connect the corresponding nodes. While described in terms of a graph, each motion planning graph does not necessarily need to be represented or stored as a conventional graph, but rather can be represented, for example logically or in a memory circuit or computer processor, using any variety of data structures (e.g., records and fields, tables, linked lists, pointers, trees).

At 506, the processor-based system optionally receives a set of swept volumes for one or more robots, for instance the robot $R_1$ for which motion is being planned, and optionally for the other robots $R_2$, $R_3$ operating in the environment. For example, the processor-based system may receive the set of swept volumes from another processor-based system, which generated the motion planning graph(s) during a configuration time, for instance as described with respect to and as illustrated in FIG. 4. Alternatively, the processor-based system may generate the set of swept volumes itself, for example based on the motion planning graphs. The swept volumes represent respective volumes swept by the robot or a portion thereof in executing a motion or translation that corresponds to a respective edge. The swept volumes may be represented in any of a large variety of forms, for example as voxels, a Euclidean distance field, a hierarchy of spheres or other geometric objects.

At 508, the processor-based system receives a number of tasks, for example in the form of task specifications. The task specifications specify robot tasks to be performed or carried out by the robots. The task specifications may, for example, specify a first task in which a robot is to move from a first position and first pose to a second position (e.g., first goal) and second pose (e.g., first goal pose), grasp an object at the second position, and a second task in which the robot is to move the object to a third position (e.g., second goal) and third pose (e.g., second goal pose) and release the object at the third position. The task specifications may take a variety of forms, for example a high level specification (e.g., prose and syntax) which requires parsing to a lower level specification. The task specifications may take the form of low level specifications, for example specifying a set of joint positions and joint angles/rotations (e.g., joint poses, joint coordinates).

At 510, the processor-based system optionally receives or generates a representation of the environment, for example a representation of the environment as sensed by one or more sensors (e.g., cameras, LIDAR). The representation can represent static or persistent objects in the environment and/or can represent dynamic or transient objects in the environment. In some implementations, one or more sensors capture and send perception data to one or more processors. The perception data can, for example, be occupancy information that represents respective locations of the obstacles in the environment. The occupancy information is typically generated by one or more sensors positioned and oriented to sense the environment in which the robot will operate or operates. The occupancy information may take the form of raw or pre-processed data, and may be formatted in any existing or later created format or schema. The perception data can, for example, be a stream that indicates which voxels or boxes are occupied by objects in the current environment. The receipt or generation of representations of the environment can occur during a period of time, for instance during an entire runtime period, and can occur periodically, aperiodically, continually and/or continuously.

For each of a number of iterations, the system receives or generates a respective discretization of a representation of an environment in which a robot 102 operates. The respective discretizations can, for example, comprise respective sets of voxels. The voxels of the respective discretizations can, for example, be non-homogenous in at least one of size and shape within the respective discretization. A respective distribution of the non-homogeneousness of the voxels of the respective discretizations can, for example, be different from one another. Obstacles may be represented digitally, for example, as bounding boxes, oriented bounding boxes, or curves (e.g., splines), whichever digital representation is most appropriate for the type of obstacle and type of collision detection that will be performed, which itself may depend on the specific hardware circuitry or software algorithm employed.

The processor-based system can, for example, represent one or more static or persistent obstacles in the environment and/or one or more dynamic or transient obstacles in the environment, including one or more other robots.

For example, at least one component of the processor-based system can receive occupancy information that represents a number of persistent obstacles in the environment and/or a number of transient obstacles in the environment. The persistent obstacles are obstacles that are generally static or remain fixed, and will not move at least during performance of one or more tasks by the robot during the runtime of the robot. The transient obstacles are obstacles that appear/enter, disappear/leave, or which are dynamic or move at least during the runtime of the robot. Thus, transient obstacles, if any, are those which, during at least some portion of the runtime have a known location and orientation in the environment and which at the configuration time did not have a known fixed location or orientation in the environment. The occupancy information may, for example, represent respective volumes occupied by each obstacle in the environment. The occupancy information may be in any known or to be developed format. The occupancy information may be generated by one or more sensors, or may be defined or specified via a computer or even by a human. The occupancy information for transient obstacles is typically received during a runtime of the robot. The persistent or static objects are sometimes identified and planned for during the configuration time, while the transient or dynamic objects are typically identified and planned for during runtime.

The at least one component of the processor-based system can generate one or more data structure representations of one or more objects or obstacles in the environment in which the robot will operate. A data structure representation can include a representation of a number of obstacles which, at a configuration time, have a known fixed location and orientation in the environment, and hence denominated as persistent in that those objects are assumed to persist in the environment at the known location and orientation from the configuration time through a run time. A data structure representation can include a representation of a number of obstacles which, at a configuration time, do not have a known fixed location and orientation in the environment and/or are expected to move during a runtime, and hence denominated as transient in that those objects are assumed to appear, disappear or move in the environment at unknown locations and orientations during a run time. Various suitable data structures, for example various hierarchical data structures (e.g., tree data structures) or non-hierarchical data structures (e.g., EDF data structures) and techniques can be employed, for example as described in PCT/US2019/045270, published as WO 2020/040979. Thus, for example, at least one component of the processor-based system receives or generates representations of obstacles in the environment as any one or more of: a Euclidean distance field, a hierarchy of bounding volumes; a tree of axis-aligned bounding boxes (AABBs), a tree of oriented (not axis-aligned) bounding boxes, a tree of spheres; a hierarchy of bounding boxes with triangle meshes as leaf nodes; a hierarchy of spheres; a k-ary sphere tree; a hierarchy of axis-aligned bounding boxes (AABB); a hierarchy of oriented bounding boxes, and/or an octree that stores voxel occupancy information. Notably, the leaves of any of the tree type data structures can be a different shape than the other nodes of the data structure, e.g., all nodes are AABBs except the root nodes or leaves which may take the form of triangle meshes. Using spheres as bounding volumes facilitates fast comparisons (i.e., it is computationally easy to determine if spheres overlap each other).

The processor-based system can, for example, use any one or more of the structures and methods described in PCT/US2019/045270, published as WO 2020/040979 to represent obstacles in the environment.

Optionally at 512, the processor-based system receives motion plans for one or more other robots, that is for robots in the environment other than the given robot for which the particular instance of motion planning is being performed. The processor-based system can advantageously use the motion plans for one or more other robots to determine whether a trajectory of a given robot (e.g., first robot $R_1$) will result in a collision or will have a non-zero probability of resulting in a collision with another robot (e.g., second robot $R_2$, third robot $R_3$), as described herein.

Optionally at 514, the processor-based system predicts motions of obstacles in the environment, for example motions or trajectories of other robots (e.g., second robot $R_2$, third robot $R_3$) in the environment. The processor-based system can, for example, extrapolate a future trajectory from a sampling of a current trajectory and/or from a knowledge or prediction of a goal of the other robot or a predicted or expected collision for the other robot. Such may be particularly useful where the motion plans for one or more other robots is not known by the processor-based system, At 516, the processor-based system represents the other robots and/or motions of the other robots as obstacles for the robot for which the particular instance of motion planning is being performed. For example, the processor-based system may queue swept volumes corresponding to each motion as obstacles in an obstacle queue. The swept volumes may have been previously determined or calculated for each edge, and logically associated with each edge in memory via a data structure (e.g., pointer). As previously noted, the swept volumes may be represented in any of a variety of forms for example as voxels, a Euclidean distance field, a hierarchy of spheres or other geometric objects.

Figures 6, 7:
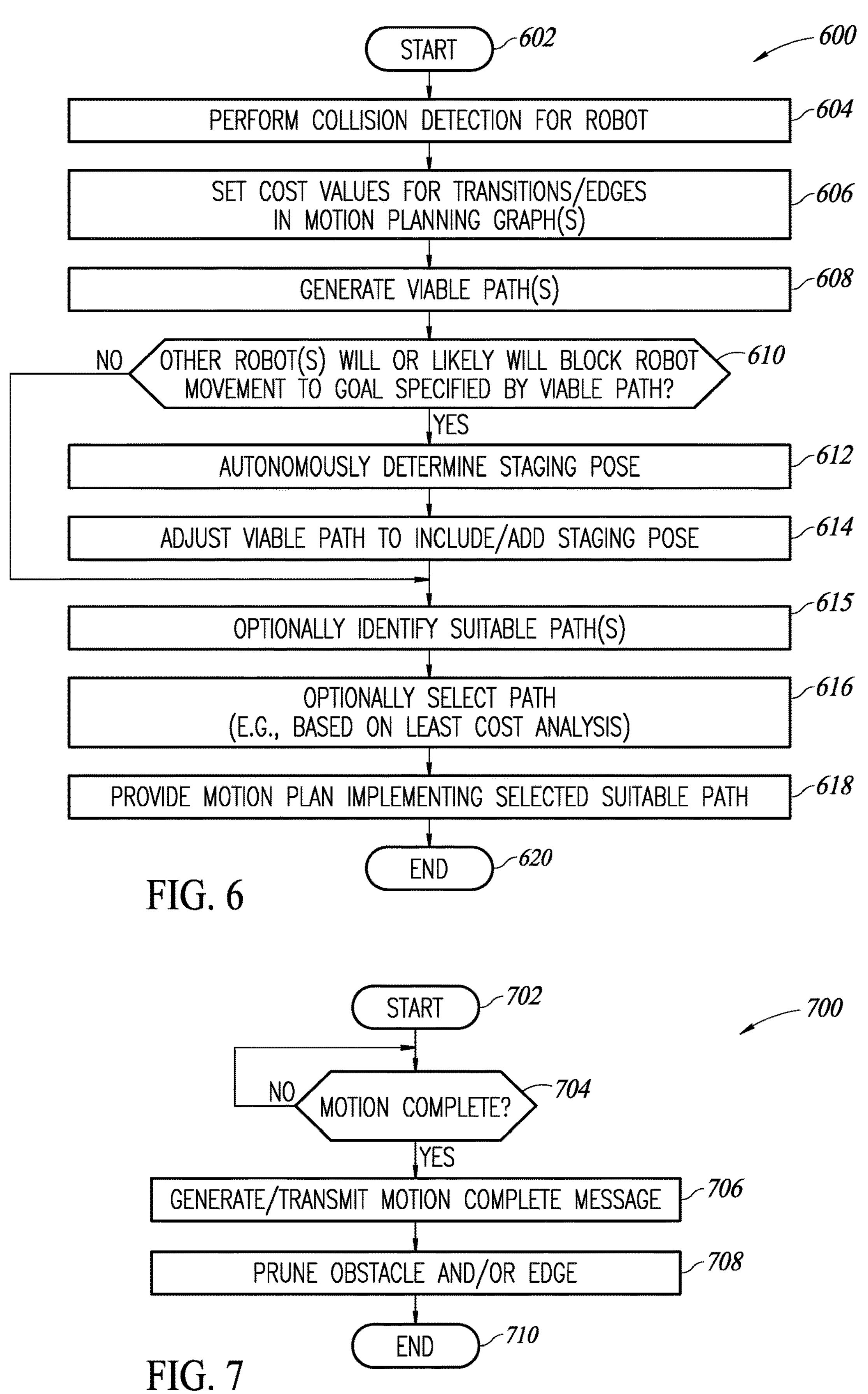
FIG. 6 is a flow diagram showing a method of operation of a processor-based system to perform motion planning for one or more robots, for example during a runtime of the robots, according to at least one illustrated implementation, executable as part of performing the method of FIG. 5.
FIG. 7 is a flow diagram showing a method of operation in a processor-based system to control operation of one or more robots in a multi-robot environment, according to at least one illustrated implementation, executable as part of performing the methods of FIG. 5 or 6.

At 518, the processor-based system performs motion planning for a given robot (e.g., first robot $R_1$) to perform a given task. Notably, the motion planning includes determining (e.g., selecting, generating) a staging pose for the given robot if the given robot or the trajectory of the given robot is blocked or has a defined, non-zero, probability of being blocked, for example by being blocked or potentially blocked by other robots (e.g., second robot $R_2$, third robot $R_3$) or movement or trajectory of the other robots in the environment. In at least some implementations, the processor-based system assesses whether the determined probability of being blocked exceeds a defined threshold probability. At least one implementation of motion planning is illustrated and described with reference to FIG. 6, below, which includes collision checking and assigning costs to edges that represent transitions in a motion planning graph. The example of FIG. 6 is not intended to be limiting, and other implementations of motion planning can be employed.

The processor-based system can optionally determine and logically associate one or more trigger conditions with the determined staging pose. The trigger condition(s) can, for example, include: 1) the blocking of the given robot and/or blocking of a trajectory of the given robot; and/or 2) occurrence or detection of an error condition or abnormality in operation of one or more robots. Error conditions or abnormality conditions may include a low power condition, a wear condition or a scheduled service condition for the selected robot, all indicating that the selected robot may not be able to complete the task at the given time. Logically associating the one or more trigger conditions with the determined staging pose can include storing a logical association between the staging pose and the one or more trigger conditions in memory or other nontransitory storage medium, for instance in a field or other element of a data structure.

The processor-based system can optionally determine and logically associate one or more release conditions with the determined staging pose. The release condition(s) can, for example, include: 1) the unblocking of the given robot and/or unblocking of a trajectory of the given robot; 2) the movement of another robot or completion of a movement of another robot, and/or 3) completion of a task by another robot. Logically associating the one or more release conditions with the determined staging pose can include storing a logical association between the staging pose and the one or more release conditions in memory or other nontransitory storage medium, for instance in a field or other element of a data structure.

At 520, the processor-based system optionally controls an operation of the given robot (e.g., first robot $R_1$) for which the motion plan was generated, causing the given robot to move per the motion plan. For example, the processor-based system may send control signals or drive signals to one or more motion controllers (e.g., motor controllers) to cause one or more actuators to move one or more linkages according to the motion plan. It is noted that while edges typically defined valid transitions between a pair of nodes, which represent respective poses, that any edge can correspond to one, two or even more movements of the robot or portion thereof. Thus, one edge can correspond to a single movement of the robot from one to another pose in a pair of poses, or alternatively one edge can correspond to a plurality of movements of the robot from one to another pose in a pair of poses.

At 522, the processor-based system monitors the planned trajectory of the given robot (e.g., first robot $R_1$) for which the motion plan was generated. Monitoring can include monitoring to determine whether the robot or trajectory of the robot is blocked, for example by another robot. Monitoring can include monitoring to determine whether the given robot or trajectory of the given robot may (e.g., potentially) be blocked by a known or predicted movement of another robot, optionally including an assessment of probability of such blocking occurring. Monitoring can include monitoring to determine whether the given robot or trajectory of the given robot becomes unblocked or potentially unblocked, for example due to movement of another robot.

Monitoring can include monitoring to determine whether the given robot has reached a goal (e.g., end goal) or achieved a goal pose (e.g., end goal pose) at which a task will be completed. Monitoring can also include monitoring for completion of motions by the robot or other robots, which can advantageously allow the processor-based system to remove obstacles corresponding to the motion from consideration during subsequent collision detection or assessment. In some implementations, such can give rise to generation of a motion completed message which can be used, for instance, for pruning obstacles, as discussed below with reference to FIG. 7. The processor-based system may rely on coordinates of the corresponding robot(s). The coordinates may be based on information from the motion controllers, actuators and/or sensors (e.g., (e.g., cameras including DOF cameras and LIDAR with or without structured lighting, rotational encoders, Reed switches). In at least some implementations, monitoring for blocking or unblocking can include performing collision detection, using any of a wide variety of collision detection techniques, for example collision detection using swept volumes representing a volume swept by the given robot and/or a volume swept by other robots or other obstacles in the environment; or collision detection employing assessment of whether two spheres intersect.

At 524, the processor-based system determines or assesses whether the given robot (e.g., first robot $R_1$) or trajectory of the given robot has become blocked or potentially blocked, or optionally a trigger condition has occurred. For example, the processor-based system can perform collision checking for a path or trajectory of the given robot with respect to one or more objects or obstacles in the operational environment. A large variety of forms of collision checking can be employed, although such should be a relatively fast process since the collision checking is typically being performed during a runtime of the robot(s). Collision checking can, for example employ swept volumes that represent areas or volumes swept by a given robot in transitioning from one pose to another pose. Collision checking can, for example employ swept volumes that represent areas or volumes swept by other robots in transitioning from one pose to another pose. Swept volumes can advantageously be computed during a configuration time, before the runtime. Collision checking can employ the determination of the intersection of spheres which represent portions of the given robot and the obstacle(s).

If the given robot (e.g., first robot $R_1$) or trajectory of the given robot has become blocked or potentially blocked (e.g., with a probability of being blocked or probability of collision equal to or exceeding a defined threshold) or alternatively some other trigger condition occurs, control passes to 526. If the given robot or trajectory of the given robot is not blocked or potentially blocked (e.g., with a probability of being blocked or probability of collision below a defined threshold), control passes to 532.

At 526, the processor-based system controls an operation of the given robot (e.g., first robot $R_1$) for which the motion plan was generated, causing the given robot to move toward a staging pose as defined in the motion plan. For example, the processor-based system may send control signals or drive signals to one or more motion controllers (e.g., motor controllers) to cause one or more actuators to move one or more linkages toward the staging pose according to the motion plan. It is noted that in at least some specific implementations, the given robot may move through one or more intermediary poses in moving toward the staging pose. It is further noted that while moving toward the staging pose, the given robot may not actually attain the staging pose, for example when and if the given robot or the trajectory of the given robot becomes unblocked before attaining the staging pose. In at least some implementations, the staging pose may be determined to advantageously transition the given robot to cause the trajectory of the given robot to become unblocked as rapidly as possible, even before the given robot obtains the staging pose. In at least some implementations, the staging pose may be determined to advantageously transition the given robot so as to eliminate or reduce (e.g., minimize) a probability of the given robot blocking or potentially blocking the other robot from moving along a known or predicted trajectory of the other robot. Additionally or alternatively, in at least some implementations, the staging pose may be determined to advantageously transition the given robot so as to eliminate or reduce (e.g., minimize) a probability of the trajectory of the given robot blocking or potentially blocking the other robot from moving along a known or predicted trajectory of the other robot.

At 528, the processor-based system determines whether the given robot (e.g., first robot $R_1$) or trajectory of the given robot has become unblocked or potentially unblocked, or optionally whether another release condition has occurred. For example, the processor-based system can perform collision checking for a path or trajectory of the given robot with respect to one or more objects or obstacles in the operational environment. A large variety of forms of collision checking can be employed, for instance collision checking using swept volumes or intersecting spheres. If the given robot or trajectory of the given robot has become unblocked or potentially unblocked, or optionally another release condition has occurred, control passes to 530. If the given robot or trajectory of the given robot has not become unblocked or potentially unblocked, or optionally another release condition has not occurred, control returns to 526 where the given robot is allowed to continue to move toward the staging pose or allowed to remain in the staging pose. As noted, in at least some specific implementations the given robot may not actually attain the staging pose.

At 530, the processor-based system causes the given robot to continue from a current pose toward the goal per motion plan. It is noted that the current pose can, for example be the staging pose in instances where the staging pose was attained before the trajectory became unblocked. In other instances, the current pose may not be the staging pose, for example where the staging pose was not attained before the trajectory became unblocked. The processor-based system, can, for example, send control signals or drive signals to one or more motion controllers (e.g., motor controllers) to cause one or more actuators to move one or more linkages according to the motion plan.

At 532, the processor-based system determines whether the given robot (e.g., first robot $R_1$) has reached the goal or has achieved a goal pose. The processor-based system may rely on coordinates of the given robot. The coordinates may be based on information from the motion controllers, actuators and/or sensors (e.g., cameras including DOF cameras and LIDAR with or with structured lighting, rotational encoders, Reed switches).

If the given robot has not reached the goal nor achieved the goal pose, control returns to 520 or optionally 518, allowing the given robot to continue to move according to the motion plan. If the given robot has reached the goal or achieved the goal pose, the method 500 terminates at 534.

Notably, in many implementations, the method 500 will repeat for additional tasks and/or additional robots. For example, the processor-based system can determine whether an end of a task queue and/or a motion planning request queue has been reached. For instance, the processor-based system can determine whether there are any motion planning requests remaining in a motion planning request queue, and/or whether all tasks in a task queue have been completed. In at least some implementations, a set of tasks (e.g., task queue) may be temporarily depleted, with the possibility of new or additional tasks later arriving. In such implementations, the processor-based system may execute a wait loop, checking for new or additional tasks from time-to-time or waiting for a signal indicating a new or additional task is available to be processed and carried out.

In some implementations, multiple instances of the method 500 can execute in a multithreaded process on one or more cores of one or more processors, for instance in parallel with one another. Thus, the method 500 may alternatively repeat until affirmatively stopped, for example by a power down state or condition.

While the method 500 of operation is described in terms of an ordered flow, the various acts or operations will in many implementations be performed concurrently or in parallel. Often, motion planning for one robot to perform one task may be carried out while one or more robots perform tasks. Thus, the performance of tasks by robots may overlap or be concurrent with or in parallel with the performance of motion planning by one or more motion planners. The performance of tasks by robots may overlap or be concurrent with or in parallel with the performance of tasks by other robots. In some implementations, at least some portion of motion planning for one robot may overlap or be concurrent with or in parallel with at least some portion of motion planning for one or more other robots.

FIG. 6 shows a method 600 of operation of a processor-based system to perform motion planning for one or more robots, according to at least one illustrated implementation. The method 600 can be executed during a runtime of the robot(s). Alternatively, a portion of the method 600 can be executed during a configuration time, before the runtime of the robot(s), and a portion of the method 600 can be executed during the runtime of the robot(s). The method 600 can, for example, be executed in performing the motion planning 518 of the method 500 (FIG. 5), although the motion planning 518 is not limited to that described and illustrated in the method 600.

The method 600 can be executed for one, two or more robots operating in a multiple robot operational environment. For example, the method 600 can be executed sequentially for each robot (e.g., a first robot $R_1$, a second robot $R_2$, a third robot $R_3$ or even more robots). For ease of discussion the method 600 is described with respect to control of a given robot (e.g., first robot $R_1$) where other robots (e.g., second robot $R_2$, third robot $R_3$) in the operational environment potentially represent obstacles to movement of the first robot. One of skill in the art will recognize from the discussion herein that this method 600 can be extrapolated to motion planning for one robot where there are two or more other robots in the operational environment, or motion plan for two or more robots where there are two or more other robots in the operational environment. Such can, for instance, be performed by sequentially executing the method 600 for each robot, and/or for instance successively iteratively executing the method 600 for a given robot relative to each of the other robots that present potential obstacles to the movement of the given robot.

The method 600 can execute at a runtime, a period during which at least one of the robots is operating (e.g., moving, performing tasks), the runtime for example following a configuration time. The method 600 may be executed by one or more processor-based systems that take the form of one or more robot control systems. The robot control systems may, for example, be co-located or located "on-board" respective ones of the robots.

The method 600 starts 602, for example in response to a powering ON of a robot and/or robot control system, in response to a call or invocation from a calling routine such as a routine executing the method 500, in response to receipt of a motion planning request or a motion planning request in a queue of motion planning requests to be performed for a robot, or in response to receipt of a task to be performed by a robot.

At 604, the processor-based system performs collision detection or assessment for a given robot (e.g., first robot $R_1$). The processor-based system may employ any of the various structures and algorithms described herein or in the materials incorporated by reference herein or described elsewhere to perform the collision detection or assessment. Collision detection or assessment may include performing collision detection or assessment for each motion against each obstacle in an obstacle queue. Examples of collision assessment are described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS"; U.S. Patent Application 62/722,067, filed Aug. 23, 2018 entitled "COLLISION DETECTION USEFUL IN MOTION PLANNING FOR ROBOTICS"; in International Patent Application Publication No. WO 2016/122840, filed Jan. 5, 2016, entitled "SPECIALIZED ROBOT MOTION PLANNING HARDWARE AND METHODS OF MAKING AND USING SAME"; and PCT/US2019/045270, published as WO 2020/040979, to produce motion planning graphs, to produce swept volumes, and/or to perform collision checking (e.g., intersection of spheres assessments). As described herein, the processor-based system can use the collision assessment to set cost values or cost functions or as part of setting cost values or cost functions for the various edges of the motion planning graph, which can be used in generating a motion plan that specifies a suitable path (e.g., an ordered set of poses) of a robot to accomplish a task.

At 606, the processor-based system sets cost values or cost functions of the edges in the motion planning graph based at least in part on the collision detection or assessment for the given robot (e.g., first robot $R_1$). Cost values or cost functions can be representative of a collision assessment or risk (e.g., probability or occurrence) of collision. Cost values can additionally be representative of a severity (e.g., magnitude of damage that would result) of a collision should a collision occur. For instance, a collision with a human or other animate object may be considered as more severe, and hence more costly, than collision with a wall or table or other inanimate object. Cost values or cost functions can additionally be representative of a use or consumption of resources associated with a transition corresponding to the respective edge, for instance an amount of energy that will be consumed or an amount of time that will be incurred in executing the associated transition. The processor-based system may employ any of the various structures and algorithms described herein or in the materials incorporated by reference herein to perform the cost value or cost function setting, typically setting or adjusting the cost for edges with no or with low risk of collision to a relatively low value (e.g., zero), and setting or adjusting the cost for edges that will result in collision or with a high risk of collision to a relatively high value (e.g., one hundred thousand). The processor-based system can, for example, set cost values or cost functions of edges in the motion planning graph by logically associating each with an associated cost value or cost function via one or more data structures.

At 608, the processor-based system generates one or more viable paths using the motion planning graph. The viable paths are paths that extend from either a starting or current node through a goal node via valid transitions. A viable path specifies a possible trajectory for the given robot through various poses corresponding to respective nodes. It is noted that one or more of the generated viable paths may not be a suitable path, for instance because a cost or cost function at a point along the path or even an accumulated cost or accumulated cost function along the path is too high (e.g., above a threshold cost or value or magnitude), and the processor-based system may eventually reject those viable paths as not being suitable for performing a particular task by the given robot even if performance of that task via transitions defined by that path is feasible and thus viable. Thus, the processor-based system can optionally identify one or more suitable paths from the set of one or more viable paths, for instance based on a cost threshold. Further, as discussed below with reference to 616, one of the viable paths, or even one of the suitable paths when such are identified, can be selected, for instance via a least cost analysis.

At 610, for each viable path the processor-based system determines or assesses whether other robot(s) will or likely will (i.e., a relatively high probability) block the given robot or movement of the given robot to a goal as the given robot moves along a trajectory as specified by the viable path. The processor-based system can, for example, employ collision detection to determine or assess whether other robot(s) will or likely will block the given robot or movement of the given robot to a goal as the given robot moves along a trajectory as specified by the viable path. For example, a probability of collision that exceeds a threshold probability of collision or a cost value or cost function that exceeds a threshold cost or cost value may be indicative of a blocking condition. Various collision detection approaches can be employed, for example as described elsewhere herein. If another robot or robots will or likely will block the given robot or movement of the given robot to a goal, control passes to 612. If another robot or robots will not or likely will not (i.e., a relatively low probability) block the given robot or movement of the given robot to a goal, control passes to 616.

At 612, for each viable path which will result in the given robot being blocked or likely blocked, the processor-based system determines, and preferably autonomously determines, a staging pose for the given robot ($R_1$). The staging pose will correspond to an existing node in the motion planning graph. Notably, there can be one or more intermediate or intervening nodes, and hence corresponding intermediate or intervening poses, between a node on the previously determined viable path and the node corresponding to the staging pose. It is also noted that a staging pose can correspond to an existing node on the previously determined viable path.

The processor-based system can, for example, determine the staging pose during a configuration time, before a runtime of the robot(s), or the processor-based system can determine the staging pose during a runtime time of the robot(s). The processor-based system can, for example, determine the staging pose dynamically, for instance based on how a given robot is or will be blocked, and/or how a given robot will or may block one or more other robots.

The processor-based system can, for example, use one or more heuristics to determine a staging pose, and its associated node, that efficiently positions or configures the given robot to complete its task once the trajectory of the robot per the path becomes unblocked or cleared and/or to position or configure the given robot so as to allow the other robots to operate in carrying out their assigned tasks.

The processor-based system can, for example, use one or more heuristics to determine a staging pose, and its associated node, that increases a probability that the trajectory of the given robot specified by the path becomes unblocked or cleared. Additionally or alternatively, the processor-based system can, for example, use one or more heuristics to determine a staging pose, and its associated node, that decreases a time or duration or decreases a predicted time or predicted duration during which the trajectory of the given robot specified by the path of the given robot is blocked or not cleared.

Additionally or alternatively, the processor-based system can, for example, use one or more heuristics to determine a staging pose, and its associated node, based, at least in part, on an assessment of distance of the staging pose to a goal pose or an assessment of distance of an end effector or end of arm tool of the given robot when in the staging pose from a goal (e.g., location in real space), for instance to minimize that distance.

Additionally or alternatively, the processor-based system can, for example, use one or more heuristics to determine a staging pose, and its associated node, based, at least in part, on an assessment of an energy expenditure (e.g., minimizing expended energy) to perform a task. The processor-based system can, for instance, determine a staging pose to minimize the energy expenditure for the given robot to perform its assigned task, to minimize the energy expenditure for the other robot(s) to perform its assigned task, and/or to minimize the energy expenditure for the combination of the given robot and the other robot(s) to perform their assigned tasks.

Additionally or alternatively, the processor-based system can, for example, use one or more heuristics to determine a staging pose, and its associated node, based, at least in part, on an assessment of a time expenditure (e.g., minimizing time) to perform a task. The processor-based system can, for instance, determine a staging pose to minimize the time expenditure for the given robot to perform its assigned task, to minimize the time expenditure for the other robot(s) to perform its assigned task, and/or to minimize the time expenditure for the combination of the given robot and the other robot(s) to perform their assigned tasks.

Additionally or alternatively, the processor-based system can, for example, use one or more heuristics to determine a staging pose, and its associated node, that increases a probability that a trajectory specified by a path for the other robot (e.g., second robot $R_2$ moving towards its current goal, second robot $R_2$ retreating from a current position or retreating from a current goal) becomes unblocked or cleared. Additionally or alternatively, the processor-based system can, for example, use one or more heuristics to determine a staging pose, and its associated node, that reduces a time or duration or reduces a predicted time or predicted duration during which a trajectory specified by a path (e.g., second robot $R_2$ moving towards its current goal, second robot $R_2$ retreating from a current position or current goal) of the other robot is blocked or not cleared.

The processor-based system can, for example, take into account an expected or predicted movement of the other robot(s) (e.g., second robot $R_2$), such that the identified (e.g., selected, generated) staging pose is suitable (e.g., best suited) for a situation that occurs as the other robot(s) moves. As an example, consider a situation where the other robot (e.g., second robot $R_2$) is right above a table, and the given robot (e.g., first robot $R_1$) for which the motion planning is being performed is currently one meter above the second robot, and the current goal of the given robot is on the table just beneath the second robot. The shortest trajectory for first robot $R_1$ is to go straight down toward the table. However, if the expected or predicted trajectory of the second robot $R_2$ is upward, it will be more efficient to cause the first robot $R_1$ to first move laterally and then move downward.

At 614, for each viable path which will result in the given robot being blocked or likely blocked, the processor-based system adjusts the viable path to include or add a node corresponding to the determined staging pose to the viable path, along with any intermediary or intervening nodes, if any. In this respect it is noted that there can be one or more intermediary or intervening poses between a pose corresponding to a node on the previously determined viable path and the staging pose, hence there can be one or more intermediary or intervening nodes corresponding to respective ones of the intermediary or intervening poses. It is also noted that a staging pose can correspond to an existing pose on the viable path. As previously noted, there can be one or more trigger conditions and/or one or more release conditions logically associated with a staging pose.

Optionally at 615, the processor-based system identifies one or more suitable paths (also interchangeably referred to as suitable viable paths or identified suitable viable paths) from one or more viable paths. The processor-based system can, for example, identify a set of viable paths that each have an associated accumulated cost across the respective viable path that is equal to or below a threshold cost. Thus, the set of suitable viable paths can include those viable paths that satisfy some defined cost condition. As noted elsewhere, cost can reflect a variety of parameters including, for example, risk of collision, severity of collision, energy expenditure, duration or latency of execution or completion of the path or assigned task. The processor-based system can enforce other conditions in addition to or in lieu of the cost condition in identifying the suitable viable paths.

Optionally at 616, the processor-based system selects a path, referred to as a selected path. The processor-based system can, for example select a path from one or more viable paths (hence interchangeably referred to as a selected viable path). The processor-based system can, for example optionally select a path from the one or more identified suitable paths (hence interchangeably referred to as the selected suitable path or the selected suitable viable path).

The processor-based system can, for example, perform a least cost analysis on a set of viable paths or the set of suitable paths to find a selected path that has either the least cost of all of the viable paths or a relatively low cost of all of the viable paths. Since cost or cost function is representative at least in part on the collision checking, selecting a path is based, at least in part, on the collision detection or assessment. A cost value or cost function can additionally be representative of other criteria and/or parameters, for instance severity of a collision should a collision occur, expenditure of energy, and/or expenditure of time, etc. The processor-based system may employ any of the various structures and algorithms described herein or in the materials incorporated by reference herein to select a path (e.g., selected path, selected viable path, selected suitable path, selected suitable viable path), for example via performing a least cost analysis on the viable paths or the suitable paths generated from the motion planning graph with associated cost values.

At 618, the processor-based system provides a motion plan implementing the selected path (e.g., selected path, selected viable path, selected suitable path, selected suitable viable path) in order to control operation of the given robot (e.g., first robot $R_1$) for which the motion plan was generated. For example, the processor-based system may send control signals or drive signals to one or more motion controllers (e.g., motor controllers) to cause one or more actuators to move one or more linkages to cause the given robot or portion thereof (e.g., appendage, end effector, end of arm tool) to move along a trajectory specified by the motion plan.

The method 600 may terminate at 620, for example until invoked again. Alternatively, the method 600 may repeat until affirmatively stopped, for example by a power down state or condition. In some implementations, the method 600 may execute as a multi-threaded process on one or more cores of one or more processors.

While the method 600 of operation is described in terms of an ordered flow, the various acts or operations will in many implementations be performed concurrently or in parallel. Often, motion planning for one robot to perform one task may be carried out while one or more robots perform tasks. Thus, the performance of tasks by robots may overlap or be concurrent with or in parallel with the performance of motion planning by one or more motion planners. The performance of tasks by robots may overlap or be concurrent with or in parallel with the performance of tasks by other robots. In some implementations, at least some portion of motion planning for one robot may overlap or be concurrent with or in parallel with at least some portion of motion planning for one or more other robots.

FIG. 7 shows an optional method 700 of operation in a processor-based system to control operation of one or more robots in a multi-robot environment, according to at least one illustrated implementation. The method 700 may be executed as part of performance of the method 500 (FIG. 5) and/or performance of the method 600 (FIG. 6), for example during a runtime of one or more robots. The method 700 may be executed by one or more processor-based systems that take the form of one or more robot control systems. The robot control systems may, for example, be co-located or "on-board" respective ones of the robots.

The method 700 starts at 702, for example in response to a power ON of a robot and/or robot control system, in response to a call or invocation from a calling routine (e.g., method 500), or in response to receipt of a set or list or queue of tasks.

Optionally at 704, the processor-based system optionally determines whether a corresponding motion has been completed. Monitoring completion of motions can advantageously allow the processor-based system to remove obstacles corresponding to the motion from consideration during subsequent collision detection or assessment. The processor-based system may rely on coordinates of the corresponding robot. The coordinates may be based on information from the motion controllers, actuators and/or sensors (e.g., cameras, rotational encoders, Reed switches) to determine whether a given motion has been completed.

Optionally at 706, the processor-based system generates or transmits a motion completed message in response to a determination that a given motion has been completed. Alternatively, the processor-based system can set and reset a flag.

At 708, the processor-based system (e.g., obstacle pruner 260, FIG. 2) prunes one or more obstacles corresponding to the given motion in response to a determination that a motion completed message has been generated or received or flag set. For example, the processor-based system may remove the corresponding obstacle from an obstacle queue. This advantageously allows collision detection or assessment to proceed with the environment cleared of a swept volume or other representation (e.g., sphere, bounding box) that is no longer present as an obstacle. Also for example, the processor-based system may remove a swept volume corresponding to an edge that represents the completed movement of a given robot. This also advantageously allows motions and corresponding swept volumes to be tracked without the need to track timing of the motions or corresponding swept volumes.

The method 700 may terminate at 710, for example until invoked again. Alternatively, the method 700 may repeat until affirmatively stopped, for example by a power down state or condition. In some implementations, the method 700 may execute as a multi-threaded process on one or more cores of one or more processors.

EXAMPLES

Example 1. A method of operation of a processor-based system to control one or more robots, the method comprising:

for a first robot of the one or more robots, assessing, by at least one processor, whether at least a second robot of the one or more robots is blocking or will block a viable path toward a first goal for the first robot;

in response to determining, by at least one processor, that the second robot is blocking or will block the viable path toward the first goal for the first robot, causing the first robot to move toward a first staging pose;

monitoring, by at least one processor, a pose of at least the second robot at least while the first robot moves toward the first staging pose; and in response to determining, by at least one processor, from the monitored pose of at least the second robot that the second robot is not blocking or will not block a viable path between a current pose of the first robot and the first goal for the first robot, causing the first robot to move toward the first goal via the viable path between a current pose of the first robot and the first goal for the first robot.

Example 2. The method of example 1 wherein assessing whether at least a second robot of the one or more robots is blocking or will block a viable path toward a first goal for the first robot includes performing collision checking between the viable path and a current pose of the second robot.

Example 3. The method of example 1 wherein assessing whether at least a second robot of the one or more robots is blocking or will block a viable path toward a first goal for the first robot includes performing collision checking between the viable path and a path of the second robot.

Example 4. The method of example 1 wherein assessing whether at least a second robot of the one or more robots is blocking or will block a viable path toward a first goal for the first robot includes performing collision checking between at least one pose of the first robot at a defined respective time and at least one pose of the second robot at the defined respective time.

Example 5. The method of example 1 wherein assessing whether at least a second robot of the one or more robots is blocking or will block a viable path toward a first goal for the first robot includes performing collision checking of one or more swept volumes that the first robot or portion thereof will sweep in transitioning along the viable path.

Example 6. The method of any of examples 1 through 5 wherein assessing whether at least a second robot of the one or more robots is blocking or will block a viable path toward a first goal for the first robot includes assessing whether at least the second robot is blocking or will block each of two or more viable paths toward the first goal for the first robot.

Example 7. The method of example 6, further comprising:

assessing, by the at least one processor, whether two or more paths toward the first goal for the first robot are viable paths based at least in part on a respective cost of each of the two or more paths relative to a threshold cost.

Example 8. The method of any of examples 1 through 5, further comprising:

autonomously determining, by the at least one processor, the first staging pose for the first robot.

Example 9. The method of example 8 wherein autonomously determining the first staging pose for the first robot includes determining a staging pose on the viable path that is between a current pose of the first robot and the first goal for the first robot.

Example 10. The method of example 8 wherein autonomously determining the first staging pose for the first robot includes determining a staging pose that is not on the viable path between a current pose of the first robot and the first goal for the first robot.

Example 11. The method of example 8 wherein autonomously determining the first staging pose for the first robot includes assessing each of a plurality of poses based at least in part on a probability over time of the first robot becoming unblocked by the second robot if the respective pose is selected as the staging pose for the first robot.

Example 12. The method of example 8 wherein autonomously determining the first staging pose for the first robot includes determining the first staging pose based at least in part on an assessment of a respective distance of the first robot from the first goal for each of a plurality of poses.

Example 13. The method of example 8 wherein autonomously determining the first staging pose for the first robot includes determining the first staging pose based at least in part on an expected movement of at least the second robot.

Example 14. The method of example 13 wherein determining the first staging pose based at least in part on an expected movement of at least the second robot includes determining the first staging pose to locate the first robot in a position that minimizes a probability of collision with the second robot as the second robot moves according to the expected movement.

Example 15. The method of example 13 wherein determining the first staging pose based at least in part on an expected movement of at least the second robot includes assessing each of a plurality of poses based at least in part on a probability over time of the second robot becoming unblocked by the first robot if the respective pose is selected as the staging pose for the first robot.

Example 16. The method of example 1, further comprising:

pausing the first robot in the first staging pose until the second robot does not block the viable path between the first staging pose of the first robot and the first goal for the first robot.

Example 17. The method of example 1 wherein in response to determining before the first robot reaches the first staging pose that the second robot is not blocking or will not block the viable path between a current pose of the first robot and the first goal for the first robot, causing the first robot to move toward the first goal via the viable path between the current pose of the first robot and the first goal for the first robot without reaching the first staging pose.

Example 18. The method of any of examples 1 through 17, further comprising:

generating a set of viable paths via a motion planning graph for the first robot;

identifying a set of suitable paths from the set of viable paths based on at least one criteria;

selecting a selected one of the suitable paths from the set of suitable paths to generate a motion plan, and causing the first robot to move according to the motion plan.

Example 19. The method of example 18 wherein one, more or all of the acts occur during a runtime of at least the first robot.

Example 20. The method of any of examples 1 through 19, further comprising:

in response to determining, by at least one processor, from the monitored pose of at least the second robot that the second robot is not blocking or will not block a viable path between a current pose of the first robot and the first goal for the first robot, performing a new iteration of motion planning for the first robot before causing the first robot to move toward the first goal via the viable path between the current pose of the first robot and the first goal for the first robot, wherein a first goal pose locates at least the portion of the first robot at the first goal.

Example 21. A processor-based system to control one or more robots, the system comprising:

at least one processor;

at least one nontransitory processor-readable medium communicatively coupled to the at least one processor and which stores processor-executable instructions which, when executed by the at least one processor, cause the at least one processor to:

execute the method of any of examples 1 through 20.

Example 22. A processor-based system to control one or more robots, the system comprising:

a first robot in a robotic environment;

at least a second robot in the robotic environment;

at least one processor; and at least one nontransitory processor-readable medium communicatively coupled to the at least one processor and which stores processor-executable instructions which, when executed by the at least one processor, cause the at least one processor to:

for a first robot of the one or more robots, assess whether at least a second robot of the one or more robots is blocking or will block a viable path toward a first goal for the first robot;

in response to a determination that the second robot is blocking or will block the viable path toward the first goal for the first robot, cause the first robot to move toward a first staging pose;

monitor a pose of at least the second robot at least while the first robot moves toward the first staging pose; and in response to a determination that the second robot is not blocking or will not block a viable path between a current pose of the first robot and the first goal for the first robot, cause the first robot to move toward the first goal via the viable path between a current pose of the first robot and the first goal for the first robot.

Example 23. The processor-based system of example 22 wherein to assess whether at least a second robot of the one or more robots is blocking or will block a viable path toward a first goal for the first robot the at least one processor performs collision checking between the viable path and a current pose of the second robot.

Example 24. The processor-based system of example 22 wherein to assess whether at least a second robot of the one or more robots is blocking or will block a viable path toward a first goal for the first robot the at least one processor performs collision checking between the viable path and a path of the second robot.

Example 25. The processor-based system of example 22 wherein to assess whether at least a second robot of the one or more robots is blocking or will block a viable path toward a first goal for the first robot the at least one processor performs collision checking between at least one pose of the first robot at a defined respective time and at least one pose of the second robot at the defined respective time.

Example 26. The processor-based system of example 22 wherein to assess whether at least a second robot of the one or more robots is blocking or will block a viable path toward a first goal for the first robot the at least one processor performs collision checking of one or more swept volumes that the first robot or portion thereof will sweep in transitioning along the viable path.

Example 27. The processor-based system of any of examples 22 through 26 wherein to assess whether at least a second robot of the one or more robots is blocking or will block a viable path toward a first goal for the first robot the at least one processor assesses whether at least the second robot is blocking or will block each of two or more viable paths toward the first goal for the first robot.

Example 28. The processor-based system of example 26 wherein the processor-executable instructions, when executed by the at least one processor, cause the at least one processor further to:

assess whether two or more paths toward the first goal for the first robot are viable paths based at least in part on a respective cost of each of the two or more paths relative to a threshold cost.

Example 29. The processor-based system of any of examples 22 through 26 wherein the processor-executable instructions, when executed by the at least one processor, cause the at least one processor further to:

autonomously determine the first staging pose for the first robot.

Example 30. The processor-based system of example 29 wherein to autonomously determine the first staging pose for the first robot the at least one processor determines a staging pose on the viable path that is between a current pose of the first robot and the first goal for the first robot.

Example 31. The processor-based system of example 29 wherein to autonomously determine the first staging pose for the first robot the at least one processor determines a staging pose that is not on the viable path between a current pose of the first robot and the first goal for the first robot.

Example 32. The processor-based system of example 29 wherein to autonomously determine the first staging pose for the first robot the at least one processor assesses each of a plurality of poses based at least in part on a probability over time of the first robot becoming unblocked by the second robot if the respective pose is selected as the staging pose for the first robot.

Example 33. The processor-based system of example 29 wherein to autonomously determine the first staging pose for the first robot the at least one processor determines the first staging pose based at least in part on an assessment of a respective distance of the first robot from the first goal for each of a plurality of poses.

Example 34. The processor-based system of example 29 wherein to autonomously determine the first staging pose for the first robot the at least one processor determines the first staging pose based at least in part on an expected movement of at least the second robot.

Example 35. The processor-based system of example 34 wherein to determine the first staging pose based at least in part on an expected movement of at least the second robot the at least one processor determines the first staging pose to locate the first robot in a position that minimizes a probability of collision with the second robot as the second robot moves according to the expected movement.

Example 36. The processor-based system of example 34 wherein to determine the first staging pose based at least in part on an expected movement of at least the second robot the at least one processor assesses each of a plurality of poses based at least in part on a probability over time of the second robot becoming unblocked by the first robot if the respective pose is selected as the staging pose for the first robot.

Example 37. The processor-based system of example 22 wherein the processor-executable instructions, when executed by the at least one processor, cause the at least one processor further to:

pause the first robot in the first staging pose until the second robot does not block the viable path between the first staging pose of the first robot and the first goal for the first robot.

Example 38. The processor-based system of example 22 wherein in response to a determination before the first robot reaches the first staging pose that the second robot is not blocking or will not block the viable path between a current pose of the first robot and the first goal for the first robot, the at least one processor causes the first robot to move toward the first goal via the viable path between the current pose of the first robot and the first goal for the first robot without reaching the first staging pose.

Example 39. The processor-based system of any of examples 22 through 38 wherein the processor-executable instructions, when executed by the at least one processor, cause the at least one processor further to:

generate a set of viable paths via a motion planning graph for the first robot;

identify a set of suitable paths from the set of viable paths based on at least one criteria;

select a selected one of the suitable paths from the set of suitable paths to generate a motion plan, and cause the first robot to move according to the motion plan.

Example 40. The processor-based system of example 39 wherein one, more or all of the acts occur during a runtime of at least the first robot.

Example 41. The processor-based system of any of examples 22 through 40 wherein the processor-executable instructions, when executed by the at least one processor, cause the at least one processor further to:

in response to a determination, from the monitored pose of at least the second robot, that the second robot is not blocking or will not block a viable path between a current pose of the first robot and the first goal for the first robot, perform a new iteration of motion planning for the first robot before causing the first robot to move toward the first goal via the viable path between the current pose of the first robot and the first goal for the first robot, wherein a first goal pose locates at least the portion of the first robot at the first goal.

Example 42. The processor-based system of any of examples 22 through 41, further comprising:

at least one sensor positioned to sense the first and the second robots in the robotic environment.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Boolean circuits, Application Specific Integrated Circuits (ASICs) and/or FPGAs. However, those skilled in the art will recognize that the implementations disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being implemented in hardware, for example in one or more FPGAs or ASICs.

The various implementations described above can be combined to provide further implementations. All of the commonly assigned US patent application publications, US patent applications, foreign patents, and foreign patent applications referred to in this specification and/or listed in the Application Data Sheet, including but not limited International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS;" International Patent Application Publication No. WO 2016/122840, filed Jan. 5, 2016, entitled "SPECIALIZED ROBOT MOTION PLANNING HARDWARE AND METHODS OF MAKING AND USING SAME"; U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS"; U.S. Patent Application Ser. No. 62/626,939, filed Feb. 6, 2018, entitled "MOTION PLANNING OF A ROBOT STORING A DISCRETIZED ENVIRONMENT ON ONE OR MORE PROCESSORS AND IMPROVED OPERATION OF SAME"; U.S. Patent Application No. 62/856,548, filed Jun. 3, 2019, entitled "APPARATUS, METHODS AND ARTICLES TO FACILITATE MOTION PLANNING IN ENVIRONMENTS HAVING DYNAMIC OBSTACLES"; U.S. Patent Application No. 62/865,431, filed Jun. 24, 2019, entitled "MOTION PLANNING FOR MULTIPLE ROBOTS IN SHARED WORKSPACE"; International Patent Application No. PCT/US2019/016700, filed Feb. 5, 2019, entitled "MOTION PLANNING OF A ROBOT STORING A DISCRETIZED ENVIRONMENT ON ONE OR MORE PROCESSORS AND IMPROVED OPERATION OF SAME" and published as WO 2019/156984; International Patent Application No. PCT/US2020/034551, filed May 26, 2020, entitled "APPARATUS, METHODS AND ARTICLES TO FACILITATE MOTION PLANNING ENVIRONMENTS HAVING DYNAMIC OBSTACLES" and published as WO 2020/247207; International Patent Application No. PCT/US2020/039193, filed Jun. 23, 2020, entitled "MOTION PLANNING FOR MULTIPLE ROBOTS IN SHARED WORKSPACE" and published as WO 2020/263861; International Patent Application No. PCT/US2020/047429, filed Aug. 21, 2020, entitled "MOTION PLANNING FOR ROBOTS TO OPTIMIZE VELOCITY WHILE MAINTAINING LIMITS ON ACCELERATION AND JERK" and published as WO 2021041223; U.S. patent application Ser. No. 17/153,662, filed Jan. 20, 2021, entitled "CONFIGURATION OF ROBOTS IN MULTI-ROBOT OPERATIONAL ENVIRONMENT" and published as US 2021/0220994; and U.S. Patent Application Ser. No. 63/318,933, filed Mar. 11, 2022, entitled "MOTION PLANNING AND CONTROL FOR ROBOTS IN SHARED WORKSPACE EMPLOYING STAGING POSES" are incorporated herein by reference, in their entirety. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operation of a processor-based system to control one or more robot, the method comprising:

for a first robot of the one or more robots, assessing, by at least one processor, whether at least a second robot of the one or more robots is blocking or will block a viable path toward a first goal for the first robot;

autonomously determining, by the at least one processor, a first staging pose for the first robot, wherein autonomously determining the first staging pose for the first robot includes determining the first staging pose based at least in part on an expected movement of at least the second robot;

in response to determining, by at least one processor, that the second robot is blocking or will block the viable path toward the first goal for the first robot, causing the first robot to move toward the first staging pose;

monitoring, by at least one processor, a pose of at least the second robot at least while the first robot moves toward the first staging pose; and in response to determining, by at least one processor, from the monitored pose of at least the second robot that the second robot is not blocking or will not block a viable path between a current pose of the first robot and the first goal for the first robot, causing the first robot to move toward the first goal via the viable path between a current pose of the first robot and the first goal for the first robot, wherein determining the first staging pose based at least in part on an expected movement of at least the second robot includes assessing each of a plurality of poses based at least in part on a probability over time of the second robot becoming unblocked by the first robot if the respective pose is selected as the staging pose for the first robot.

2. The method of claim 1 wherein assessing whether at least a second robot of the one or more robots is blocking or will block a viable path toward a first goal for the first robot includes performing collision checking between the viable path and a path of the second robot.

3. The method of claim 1 wherein assessing whether at least a second robot of the one or more robots is blocking or will block a viable path toward a first goal for the first robot includes performing collision checking of one or more swept volumes that the first robot or portion thereof will sweep in transitioning along the viable path.

4. The method of claim 1 wherein assessing whether at least a second robot of the one or more robots is blocking or will block a viable path toward a first goal for the first robot includes assessing whether at least the second robot is blocking or will block each of two or more viable paths toward the first goal for the first robot.

5. The method of claim 1 wherein autonomously determining the first staging pose for the first robot includes determining a staging pose on the viable path that is between a current pose of the first robot and the first goal for the first robot.

6. The method of claim 1 wherein autonomously determining the first staging pose for the first robot includes determining a staging pose that is not on the viable path between a current pose of the first robot and the first goal for the first robot.

7. The method of claim 1 wherein autonomously determining the first staging pose for the first robot includes assessing each of a plurality of poses based at least in part on a probability over time of the first robot becoming unblocked by the second robot if the respective pose is selected as the staging pose for the first robot.

8. The method of claim 1 wherein autonomously determining the first staging pose for the first robot includes determining the first staging pose based at least in part on an assessment of a respective distance of the first robot from the first goal for each of a plurality of poses.

9. The method of claim 1 wherein determining the first staging pose based at least in part on an expected movement of at least the second robot includes determining the first staging pose to locate the first robot in a position that minimizes a probability of collision with the second robot as the second robot moves according to the expected movement.

10. The method of claim 1, further comprising:

pausing the first robot in the first staging pose until the second robot does not block the viable path between the first staging pose of the first robot and the first goal for the first robot.

11. The method of claim 1 wherein in response to determining before the first robot reaches the first staging pose that the second robot is not blocking or will not block the viable path between a current pose of the first robot and the first goal for the first robot, causing the first robot to move toward the first goal via the viable path between the current pose of the first robot and the first goal for the first robot without reaching the first staging pose.

12. The method of claim 1, further comprising:

generating a set of viable paths via a motion planning graph for the first robot;

identifying a set of suitable paths from the set of viable paths based on at least one criteria;

selecting a selected one of the suitable paths from the set of suitable paths to generate a motion plan, and causing the first robot to move according to the motion plan.

13. The method of claim 1, further comprising:

in response to determining, by at least one processor, from the monitored pose of at least the second robot that the second robot is not blocking or will not block a viable path between a current pose of the first robot and the first goal for the first robot, performing a new iteration of motion planning for the first robot before causing the first robot to move toward the first goal via the viable path between the current pose of the first robot and the first goal for the first robot, wherein a first goal pose locates at least a portion of the first robot at the first goal.

14. A processor-based system to control one or more robots, the system comprising:

a first robot in a robotic environment;

at least a second robot in the robotic environment;

at least one processor; and at least one non-transitory processor-readable medium communicatively coupled to the at least one processor and which stores processor-executable instructions which, when executed by the at least one processor, cause the at least one processor to:

for a first robot of the one or more robots, assess whether at least a second robot of the one or more robots is blocking or will block a viable path toward a first goal for the first robot;

autonomously determine a first staging pose for the first robot, wherein to autonomously determine the first staging pose for the first robot the at least one processor determines the first staging pose based at least in part on an expected movement of at least the second robot;

in response to a determination that the second robot is blocking or will block the viable path toward the first goal for the first robot, cause the first robot to move toward the first staging pose;

monitor a pose of at least the second robot at least while the first robot moves toward the first staging pose; and in response to a determination from the monitored pose of at least the second robot that the second robot is not blocking or will not block a viable path between a current pose of the first robot and the first goal for the first robot, cause the first robot to move toward the first goal via the viable path between a current pose of the first robot and the first goal for the first robot, wherein to determine the first staging pose based at least in part on an expected movement of at least the second robot the at least one processor assesses each of a plurality of poses based at least in part on a probability over time of the second robot becoming unblocked by the first robot if the respective pose is selected as the staging pose for the first robot.

15. The processor-based system of claim 14 wherein to assess whether at least a second robot of the one or more robots is blocking or will block a viable path toward a first goal for the first robot the at least one processor performs collision checking between the viable path and a path of the second robot.

16. The processor-based system of claim 14 wherein to assess whether at least a second robot of the one or more robots is blocking or will block a viable path toward a first goal for the first robot the at least one processor performs collision checking of one or more swept volumes that the first robot or portion thereof will sweep in transitioning along the viable path.

17. The processor-based system of claim 14 wherein to assess whether at least a second robot of the one or more robots is blocking or will block a viable path toward a first goal for the first robot the at least one processor assesses whether at least the second robot is blocking or will block each of two or more viable paths toward the first goal for the first robot.

18. The processor-based system of claim 14 wherein the processor-executable instructions, when executed by the at least one processor, cause the at least one processor further to:

assess whether two or more paths toward the first goal for the first robot are viable paths based at least in part on a respective cost of each of the two or more paths relative to a threshold cost.

19. The processor-based system of claim 14 wherein to autonomously determine the first staging pose for the first robot the at least one processor determines a staging pose on the viable path that is between a current pose of the first robot and the first goal for the first robot.

20. The processor-based system of claim 14 wherein to autonomously determine the first staging pose for the first robot the at least one processor determines a staging pose that is not on the viable path between a current pose of the first robot and the first goal for the first robot.

21. The processor-based system of claim 14 wherein to autonomously determine the first staging pose for the first robot the at least one processor determines the first staging pose based at least in part on an assessment of a respective distance of the first robot from the first goal for each of a plurality of poses.

22. The processor-based system of claim 14 wherein to determine the first staging pose based at least in part on an expected movement of at least the second robot the at least one processor determines the first staging pose to locate the first robot in a position that minimizes a probability of collision with the second robot as the second robot moves according to the expected movement.

23. The processor-based system of claim 14 wherein the processor-executable instructions, when executed by the at least one processor, cause the at least one processor further to:

pause the first robot in the first staging pose until the second robot does not block the viable path between the first staging pose of the first robot and the first goal for the first robot.

* * * * *